US010120221B2

(12) United States Patent
Ohashi

(10) Patent No.: US 10,120,221 B2
(45) Date of Patent: Nov. 6, 2018

(54) DISPLAY APPARATUS AND TELEVISION RECEIVING APPARATUS

(71) Applicant: Sharp Kabushiki Kaisha, Osaka (JP)

(72) Inventor: Mamoru Ohashi, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 515 days.

(21) Appl. No.: 14/773,938

(22) PCT Filed: Feb. 26, 2014

(86) PCT No.: PCT/JP2014/054645
§ 371 (c)(1),
(2) Date: Sep. 9, 2015

(87) PCT Pub. No.: WO2014/141882
PCT Pub. Date: Sep. 18, 2014

(65) Prior Publication Data
US 2016/0018691 A1    Jan. 21, 2016

(30) Foreign Application Priority Data
Mar. 11, 2013  (JP) .................................. 2013-047774

(51) Int. Cl.
G02F 1/1333      (2006.01)
G02B 6/00        (2006.01)
(Continued)

(52) U.S. Cl.
CPC .......... G02F 1/133308 (2013.01); G02B 6/00 (2013.01); G02B 6/0011 (2013.01);
(Continued)

(58) Field of Classification Search
CPC .......... G02F 1/133308; G02F 1/13452; G02F 2001/133317; G02B 6/00; G02B 6/0011; H04N 5/44
(Continued)

(56) References Cited

U.S. PATENT DOCUMENTS 8,854,570 B2 * 10/2014  Yu ..................... G02F 1/133615
                                              349/58
9,039,267 B2 *  5/2015  Que .................. G02F 1/133615
                                              362/612
(Continued)

FOREIGN PATENT DOCUMENTS

JP    2009-176544 A    8/2009
JP    2009-276759 A    11/2009
(Continued)

Primary Examiner — Hoan C Nguyen
(74) Attorney, Agent, or Firm — ScienBiziP, P.C.

(57) ABSTRACT

A liquid crystal display device includes: LEDs; a liquid crystal panel; a flexible board connected to the liquid crystal panel; a driver mounted on the flexible board; a frame that has a frame section that has a frame-like shape and that holds the liquid crystal panel, and a side wall that extends from the edge of the frame section to the side opposite of a display surface side; and a source driver holder that holds the flexible board to the frame, and that has a first holding section that is disposed along the frame section and of which a portion is attached to the frame section and a second holding section that extends from the edge of the first holding section to the side opposite of the side of the display surface side.

12 Claims, 14 Drawing Sheets

(51) Int. Cl.
*F21V 8/00* (2006.01)
*H04N 5/44* (2011.01)
*G02F 1/1345* (2006.01)

(52) U.S. Cl.
CPC ........... H04N 5/44 (2013.01); *G02F 1/13452* (2013.01); *G02F 2001/133317* (2013.01)

(58) Field of Classification Search
USPC .......................................................... 349/58
See application file for complete search history.

(56) References Cited

U.S. PATENT DOCUMENTS

| | | |
|---|---|---|
| 2009/0190062 A1 | 7/2009 | Sudo |
| 2010/0118514 A1 | 5/2010 | Cho et al. |
| 2010/0277664 A1* | 11/2010 | Kim ..................... G02B 6/0085 349/58 |
| 2013/0016524 A1 | 1/2013 | Momose et al. |
| 2013/0027977 A1* | 1/2013 | Urano .................. G02B 6/0036 362/613 |

FOREIGN PATENT DOCUMENTS

| | | |
|---|---|---|
| JP | 2010-118348 A | 5/2010 |
| JP | 2013-037331 A | 2/2013 |
| WO | 2012/14601 A1 | 2/2012 |

\* cited by examiner

DISPLAY APPARATUS AND TELEVISION RECEIVING APPARATUS

TECHNICAL FIELD

The present invention relates to a display device and a television receiver.

BACKGROUND ART

One end of a flexible board, on which a driver for driving liquid crystals is mounted, is connected to a liquid crystal panel used in a liquid crystal display device such as a liquid crystal television, and the driving of the liquid crystal panel is controlled by providing to the liquid crystal panel a driving signal processed in the driver, for example. Such a flexible board on which a driver is mounted is held to a frame member such as a frame via a holder attached to the frame member, and the holder holds the liquid crystal panel. This type of liquid crystal display device is disclosed in Patent Document 1, for example.

RELATED ART DOCUMENT

Patent Document

Patent Document 1: Japanese Patent Application Laid-Open Publication No. 2009-276759

Problems to be Solved by the Invention

A holder for holding the above-mentioned flexible board is attached along a plate surface that forms a frame in the frame member. Usually, such a holder, in addition to being attached to the frame member, is configured so as to be supported by a plastic chassis disposed on the inner side of the frame member in a backlight device that forms a part of the liquid crystal display device.

However, in response to demands in recent years to decrease production costs and produce even thinner devices, consideration has been given to eliminating synthetic resin cabinets, which are an exterior member of liquid crystal display devices. In liquid crystal display devices that do not include such a cabinet, the above-mentioned plastic chassis is also removed. As a result, in liquid crystal display devices which do not include a cabinet, the holder for holding the flexible board cannot be adequately supported, and there is the possibility that the holder may bend.

SUMMARY OF THE INVENTION

The technology disclosed in the present specification was made in view of the above-mentioned problems. In the present specification, an aim of the present invention is to provide, in a display device without a cabinet, a technology in which it is possible to prevent or control the bending of a holding member that holds a flexible board by increasing the strength of the holding member.

Means for Solving the Problems

The technology disclosed in the present specification relates to a display device, including: a light source; a display panel that performs display by using light from the light source; a flexible board that has one end connected to the display panel; a driving part that is mounted on the flexible board and that drives the display panel; a frame having a frame section that holds the display panel by pressing on an edge on a display surface side of the display panel, and a side wall that extends from an edge of the frame section toward a side of the display device that is opposite to the display surface side; and a holding member that holds the flexible board with respect to the frame, the holding member having a first holding section that is disposed along the frame section, the first holding section having a portion that is attached to the frame section, and a second holding section disposed along the side wall of the frame and extending from an edge of the first holding section toward the side of the display device that is opposite of the display surface side.

According to the above-mentioned display device, the strength of the holding member can be increased by having the second holding section of the holding member, which extends from the first holding section along the side wall, function as a rib disposed on the first holding section. As a result, bending of the holding member due to insufficient strength can be prevented or suppressed during the manufacturing process and the like of the display device. As mentioned above, bending of the holding member can be prevented or suppressed in the above-mentioned display device by increasing the strength of the holding member that holds the flexible board, even if the display device does not include a cabinet.

The display device may further include a signal transmission substrate that is connected to another end of the flexible board and that transmits signals to the driving part, and the signal transmission substrate may be disposed between the side wall of the frame and the second holding section.

By using such a configuration, the signal transmission substrate is supported by being disposed between the side wall and the second holding section. Thus, the signal transmission substrate can be prevented from tilting toward the side opposite of the side wall during the manufacturing process and the like of the display device. Therefore, during the manufacturing process and the like of the display device, when a member is disposed on the side opposite of the side wall so as to face the signal transmission substrate, the member can be prevented from interfering with the signal transmission substrate. This leads to an improvement in the workability of the device.

The first holding section may be configured, by having a wide region and a narrow region, so as not to overlap the driving part in a thickness direction of the flexible board.

By using such a configuration, the holding member will not interfere with the driving part.

The first holding section may be configured such that a plurality of the wide regions and a plurality of the narrow regions are alternately disposed, and may have a spanning section that spans a gap between the wide regions that are adjacent to each other.

By using such a configuration, the space between adjacent wide regions is reinforced by the spanning section. Thus, the holding member can be further strengthened while at the same time the holding member is prevented from interfering with the driving part.

The display device may be configured so that: the flexible board is provided in a plurality; the portion of the first holding section that is attached to the frame is a protrusion that protrudes toward the frame; and the protrusion is disposed between two of the flexible boards that are adjacent to each other.

Using such a configuration can prevent the protrusion from interfering with the flexible board, while at the same time making it easy to attach the holding member to the frame, since the portion of the holding member that is attached to the frame is also the protrusion that protrudes toward the frame.

The display device may also be configured so that: the device further includes a light guide plate that has a light-receiving face disposed on at least one end face of the light guide plate, the light-receiving face receiving light from the light source, and a light-exiting surface disposed on one surface of the light guide plate so as to face the display panel; at least a portion of the first holding section of the holding member is disposed so as to be on a light-exiting surface side of the light source overlapping with the light guide plate in a plan view; and the portion of the first holding section has such a thickness so as to abut an edge of the light-exiting surface of the light guide plate adjacent to the light-receiving face.

By using such a configuration, light emitted from the light source is prevented from leaking to the display panel side, or the amount of light that is leaked is suppressed by means of the first holding section. This is due to the fact that the holding member takes up a large portion of the space between the light source and the display panel, since the first holding section abuts the edge of the light-exiting surface of the light guide plate adjacent to the light-receiving face.

The portion of the first holding section that protrudes toward the light source may be configured so as to have light-reflective properties.

Such a configuration can cause light emitted by the light source toward the first holding section to be reflected by the first holding section, the light being reflected toward the light-exiting surface of the light guide plate. As a result, the light-receiving efficiency of the light guide plate with respect to light emitted by the light source can be increased.

The display device may be configured so that: the device further includes a light source substrate upon which a plurality of the light sources have been mounted, and a heat-dissipating member to which the light source substrate is attached; and the second holding section of the holding member abuts a portion of the heat-dissipating member.

Using such a configuration improves the ability of the device to dissipate heat via the heat-dissipating member, while also holding the second holding section via the heat-dissipating member.

The display device may be configured so that: the portion of the heat-dissipating member is attached to the second holding section, and the heat-dissipating member is separated from the frame.

By using such a configuration, the heat transferred from the light source to the heat-dissipating member is transferred to the frame via the second holding section. Thus, it can be made more difficult for heat to transfer to the accessible frame, when compared to a configuration in which heat transferred to the heat-dissipating member from the light source can be directly transferred to the frame.

The display device may be configured so that: the device further includes a chassis that is disposed on a side opposite of the frame so as to face the holding member and that has at least a bottom plate; the heat-dissipating member has a light source attachment section to which the light source substrate is attached and a heat-dissipating section that extends in parallel in a plate-like shape from an edge of the light source attachment section to the bottom plate; and an entire surface of the heat-dissipating section abuts the bottom plate.

By using such a configuration, it can be made difficult for heat to be transferred to the accessible frame since the majority of the heat transferred from the light source to the heat-dissipating member is dissipated to the chassis side via the heat-dissipating section.

The flexible board may be provided in a plurality, the plurality of flexible boards may include a source side flexible board that is connected to one edge of the display panel and a gate side flexible board disposed on another edge of the display panel, and the holding member may be disposed in plurality so as to respectively hold the source side flexible board and the gate side flexible board with respect to the frame.

By using such a configuration, strength can be increased in both the holding member that holds the source side flexible board and the holding member that holds the gate side flexible board.

According to the technique disclosed in the present specification, a display device that uses, as the above-mentioned display panel, a liquid crystal panel having liquid crystals is novel and useful. A television receiver that includes the above-mentioned display device is also novel and useful.

Effects of the Invention

According to the technology disclosed in the present specification, bending of a holding member that holds a flexible board can be prevented or suppressed in a display device that does not include a cabinet. This is done by increasing the strength of the holding member.

DETAILED DESCRIPTION OF EMBODIMENTS

Embodiment 1

Embodiment 1 will be described with reference to the drawings. In the present embodiment, a liquid crystal display device (an example of a display device) 10 will be described as an example. Each of the drawings indicates an X axis, a Y axis, and a Z axis in a portion of the drawings, and each of the axes indicates the same direction for the respective drawings. The Y axis direction corresponds to the vertical direction and the X axis direction corresponds to the horizontal direction. Unless otherwise noted, "up" and "down" in the description is based on the vertical direction.

Figure 1:
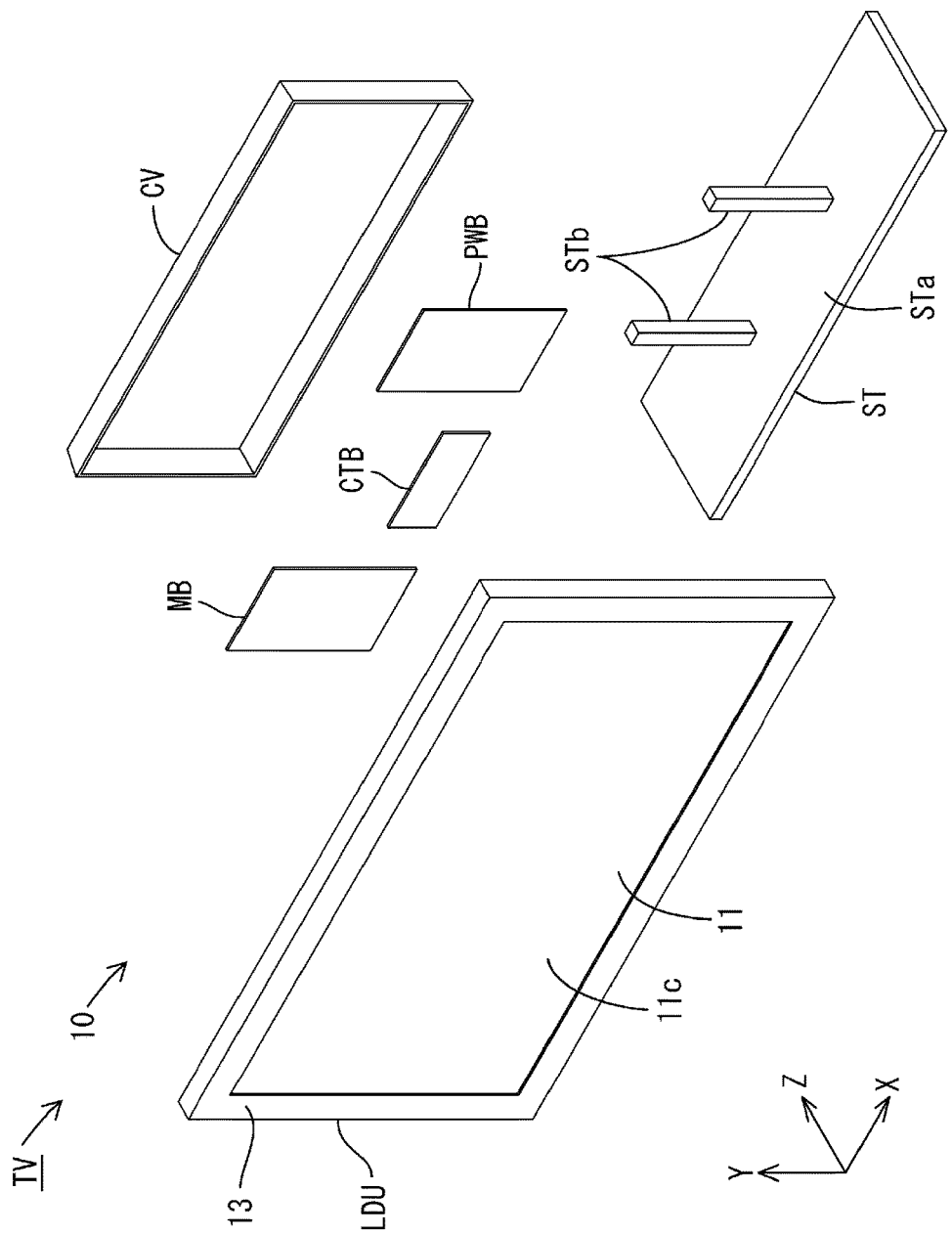
FIG. 1 is an exploded perspective view showing a schematic configuration of a television receiver and a liquid crystal display unit of Embodiment 1.
Figure 2:
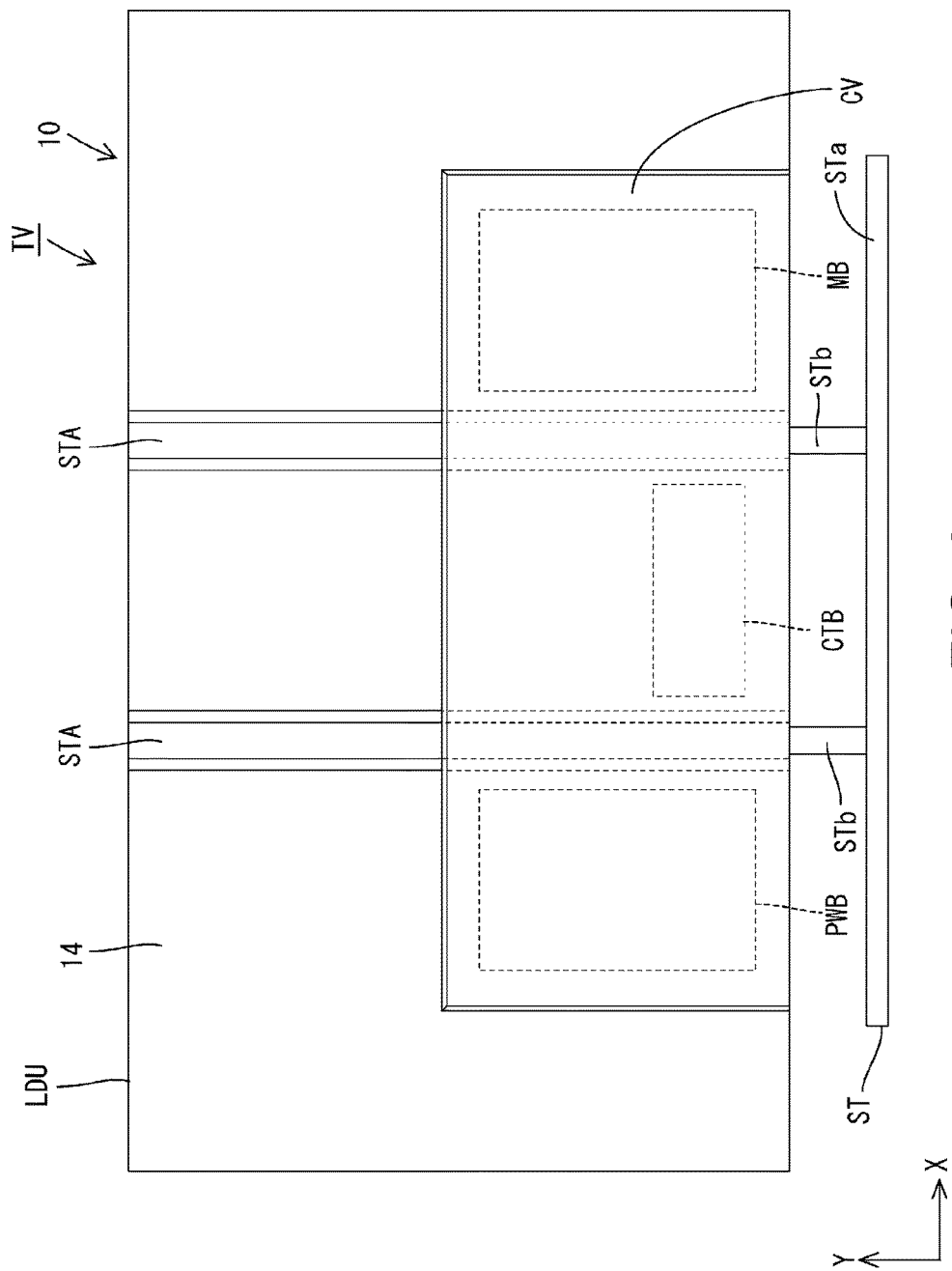
FIG. 2 is a rear view of the television receiver and a liquid crystal display device.

As shown in FIG. 1, a television receiver TV that has the liquid crystal display device 10 includes: a liquid crystal display unit LDU; various types of boards PWB, MB, and CTB attached to the back side (rear side) of the liquid crystal display unit LDU; a cover member CV attached to the back side of the liquid crystal display unit LDU and covering the various types of boards PWB, MB, and CTB; and a stand ST. The stand ST holds the television receiver TV such that the display surface of the liquid crystal display unit LDU is held along the vertical direction (Y axis direction). The liquid crystal display device 10 of the present embodiment is the portion excluding at least the configuration for receiving television signals (such as a tuner section of a main board MB) of the television receiver TV having the above-mentioned configuration. As shown in FIG. 2, the liquid crystal display unit LDU has a horizontally-long quadrilateral shape (rectangular) as a whole, and includes a liquid crystal panel 11, which is a display panel, and a backlight device 12, which is an external light source. These are integrally held together by a frame 13 and a chassis 14, which are external members that constitute the exterior of the liquid crystal display device 10. The chassis 14 of the present embodiment is one of the exterior members and is also a part of the backlight device 12.

First, the configuration of the rear side of the liquid crystal display device 10 will be explained. As shown in FIG. 2, on the rear of the chassis 14 that constitutes the rear exterior of the liquid crystal display device 10, a pair of stand attachment members STA extending along the Y axis direction is attached at two locations that are separated from each other along the X axis direction. The cross-sectional shape of these stand attachment members STA has a substantially channel shape that opens toward the chassis 14, and a pair of support columns STb of the stand ST is inserted into respective spaces formed between the stand attachment members STA and the chassis 14, respectively. Wiring members (such as electric wires) connected to an LED substrate 18 (see FIG. 3) of the backlight device 12 run through a space inside the stand attachment members STA. The stand ST is constituted of a base STa that is disposed in parallel to the X axis direction and the Z axis direction, and the pair of support columns STb that stand on the base STa along the Y axis direction. The cover member CV is made of a synthetic resin, and is attached so as to cover approximately a half of the lower part of the rear side of the chassis 14 of FIG. 2, while crossing over the pair of stand attachment members STA along the X axis direction. Between the cover member CV and the chassis 14, a component housing space is provided to house the components mentioned below such as the various boards PWB, MB, and CTB.

As shown in FIG. 2, the various boards PWB, MB, and CTB include a power supply board PWB, the main board MB, and a control board CTB. The power supply board PWB is a power source for the liquid crystal display device 10, and can supply driving power to the other boards MB and CTB, LEDs (which are an example of a light source) 17 in the backlight device 12, and the like. Therefore, the power supply board PWB doubles as an LED driver board that drives the LEDs 17. The main board MB has at least a tuner section that can receive television signals and an image processing section that performs image-processing on the received television signals (neither the tuner part nor the image processing part are shown in FIG. 2), and can output the processed image signals to the control board CTB described below. When the liquid crystal display device 10 is connected to an external video playback device (not shown), an image signal from the video playback device is inputted into the main board MB, and the main board MB can output the image signal to the control board CTB after processing the signal in the image processing section. The control board CTB has the function of converting the image signal input from the main board to a signal for driving liquid crystals, and supplying the converted signal for liquid crystal driving to the liquid crystal panel 11.

Figure 3:
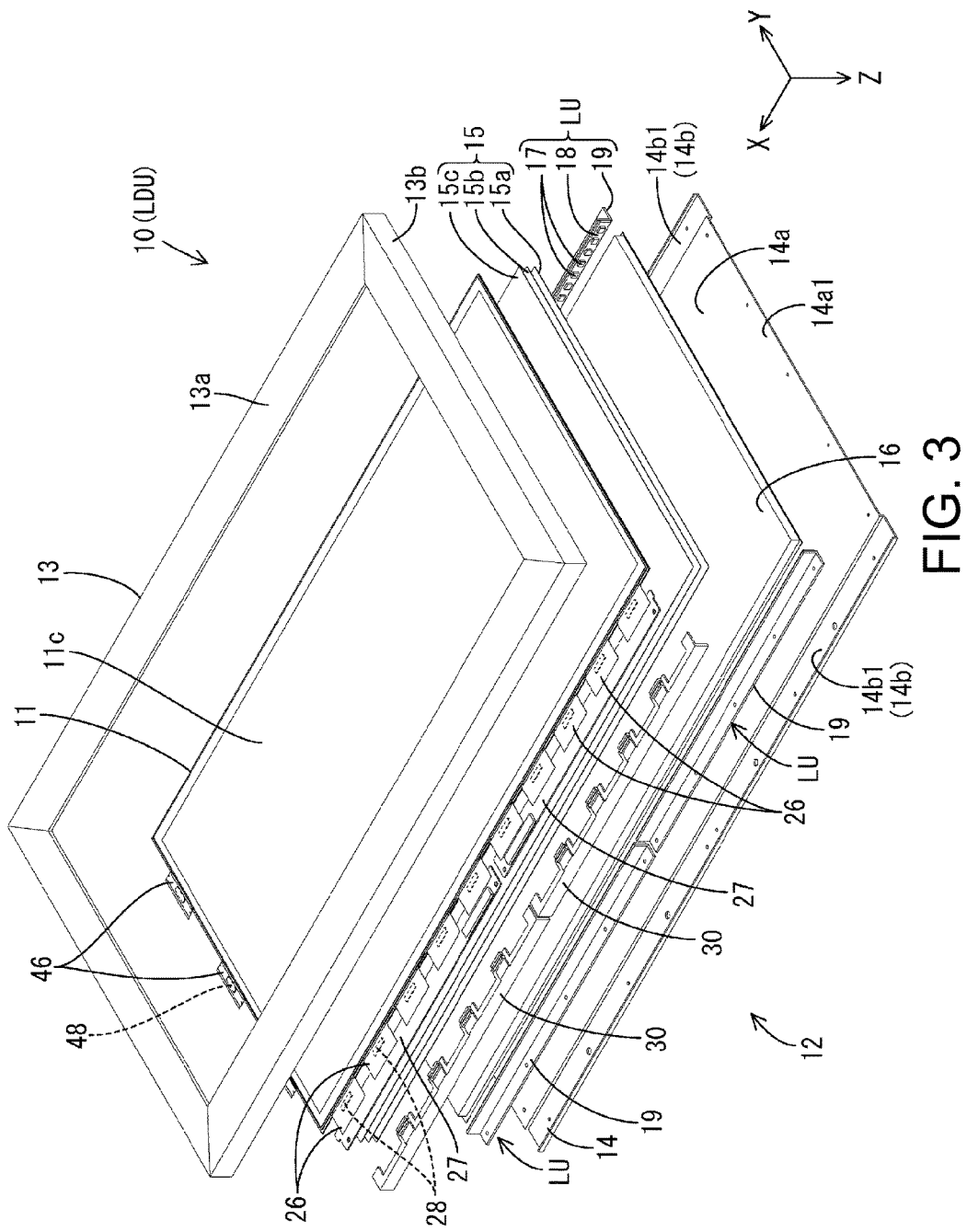
FIG. 3 is an exploded perspective view showing a schematic configuration of the liquid crystal display unit that constitutes a part of the liquid crystal display device.

As shown in FIG. 3, the main constituting components of the liquid crystal display unit LDU, which forms a portion of the liquid crystal display device 10, are housed in a space between the frame 13 that constitutes the front exterior of the liquid crystal display device 10, and the chassis 14 that constitutes the rear exterior. The main constituting components housed between the frame 13 and the chassis 14 include at least the liquid crystal panel 11, an optical member 15, a light guide plate 16, and LED units LU. Of these, the liquid crystal panel 11, the optical member 15, and the light guide plate 16 are held by being sandwiched between the frame 13 on the front side and the chassis 14 on the rear side while being stacked one on top of the other. The backlight device 12 is constituted of the optical member 15, the light guide plate 16, the LED units LU, and the chassis 14, and is the configuration of the liquid crystal display unit LDU described above that excludes the liquid crystal panel 11 and the frame 13. A pair of the LED units LU, which is a part of the backlight device 12, is disposed between the frame 13 and the chassis 14 so as to be on both sides of the light guide plate 16, facing each other in the short side direction (Y axis direction) thereof. The LED unit LU is constituted of the LEDs 17, which are the light source, an LED substrate (an example of a light source substrate) 18 on which the LEDs 17 are mounted, and a heat-dissipating member (heat spreader) 19 to which the LED substrate 18 is attached. The respective constituting components will be explained below.

As shown in FIG. 3, the liquid crystal panel 11 is formed in a horizontally long quadrangular shape (rectangular shape) in a plan view, and is configured by bonding a pair of glass substrates 11a, 11b with excellent light transmittance to each other with a prescribed gap therebetween, and by sealing liquid crystal between the two substrates 11a, 11b. Of the two substrates 11a and 11b, the one on the front side (front surface side) is a CF substrate 11a, and the other on the rear side (rear surface side) is an array substrate 11b. On the array substrate 11b, switching elements (TFTs, for example) connected to source wiring lines and gate wiring lines that intersect with each other, pixel electrodes connected to the switching elements, an alignment film, and the like are provided. Specifically, the array substrate 11b is provided with a plurality of TFTs and pixel electrodes in a line, these TFTs and pixel electrodes having a plurality of gate wiring lines and source wiring lines that are arranged in a grid pattern so as to surround the TFTs and the pixel electrodes. The gate wiring lines and the source wiring lines are connected respectively to a gate electrode and a source electrode of the TFT, the pixel electrodes being connected to a drain electrode of the TFT. Furthermore, the array substrate 11b has capacitance wiring lines (auxiliary capacitance wiring lines, storage capacitance wiring lines, Cs lines) that are in parallel with the gate wiring lines and are disposed so as to overlap the gate wiring lines in a plan view with respect to the pixel electrodes, the capacitance wiring lines and the gate wiring lines being alternately arranged in a line along the Y axis direction. On the other hand, in the CF substrate 11a, color filters having respective colored portions such as R (red), G (green), and B (blue) arranged in a prescribed pattern, opposing electrodes, an alignment film, and the like are provided. Polarizing plates (not shown) are respectively provided on outer sides of the two substrates 11a and 11b.

Figure 4:
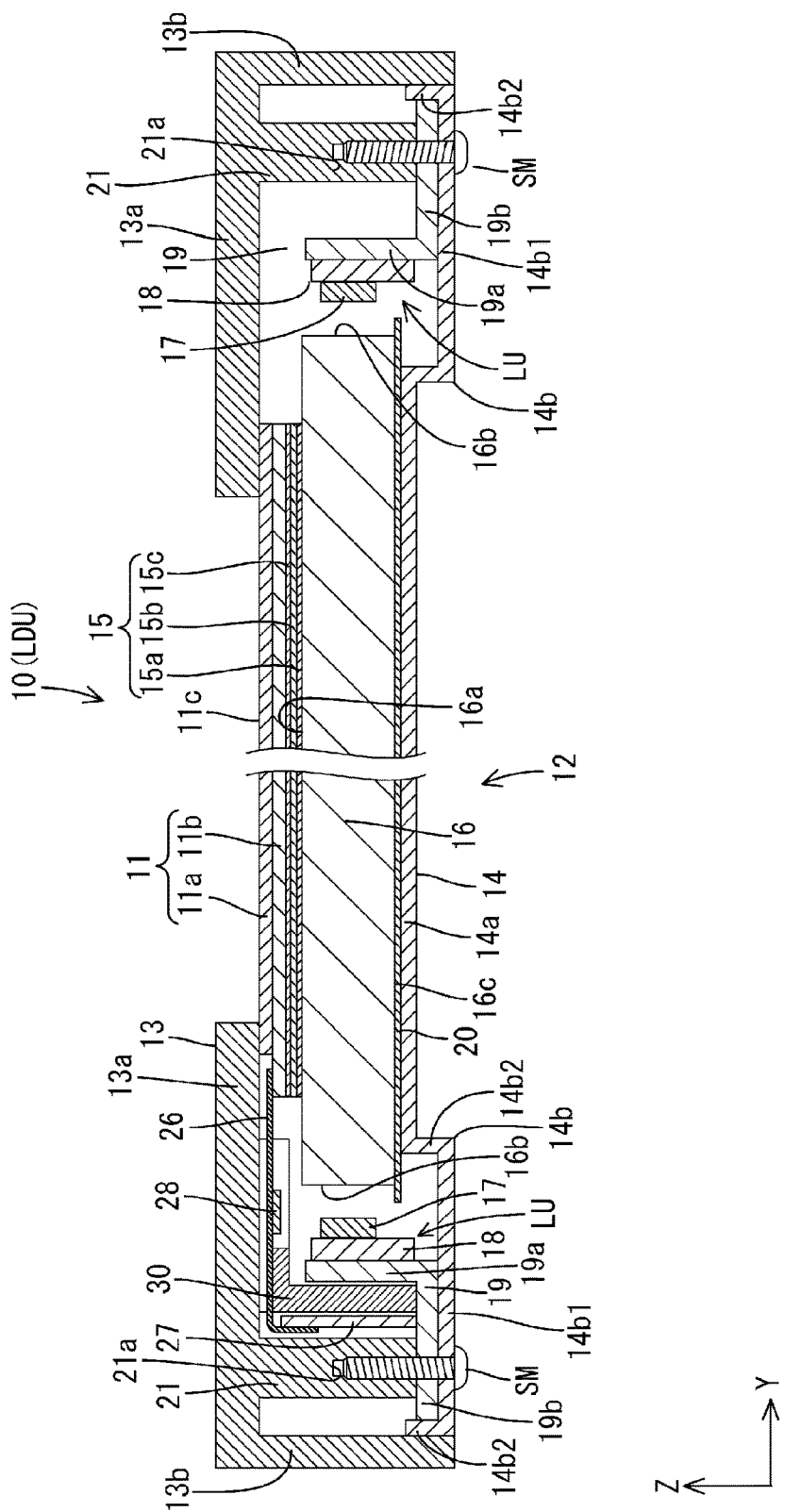
FIG. 4 is a cross-sectional view that shows a cross-sectional configuration of the liquid crystal display device along a short side direction.
Figure 5:
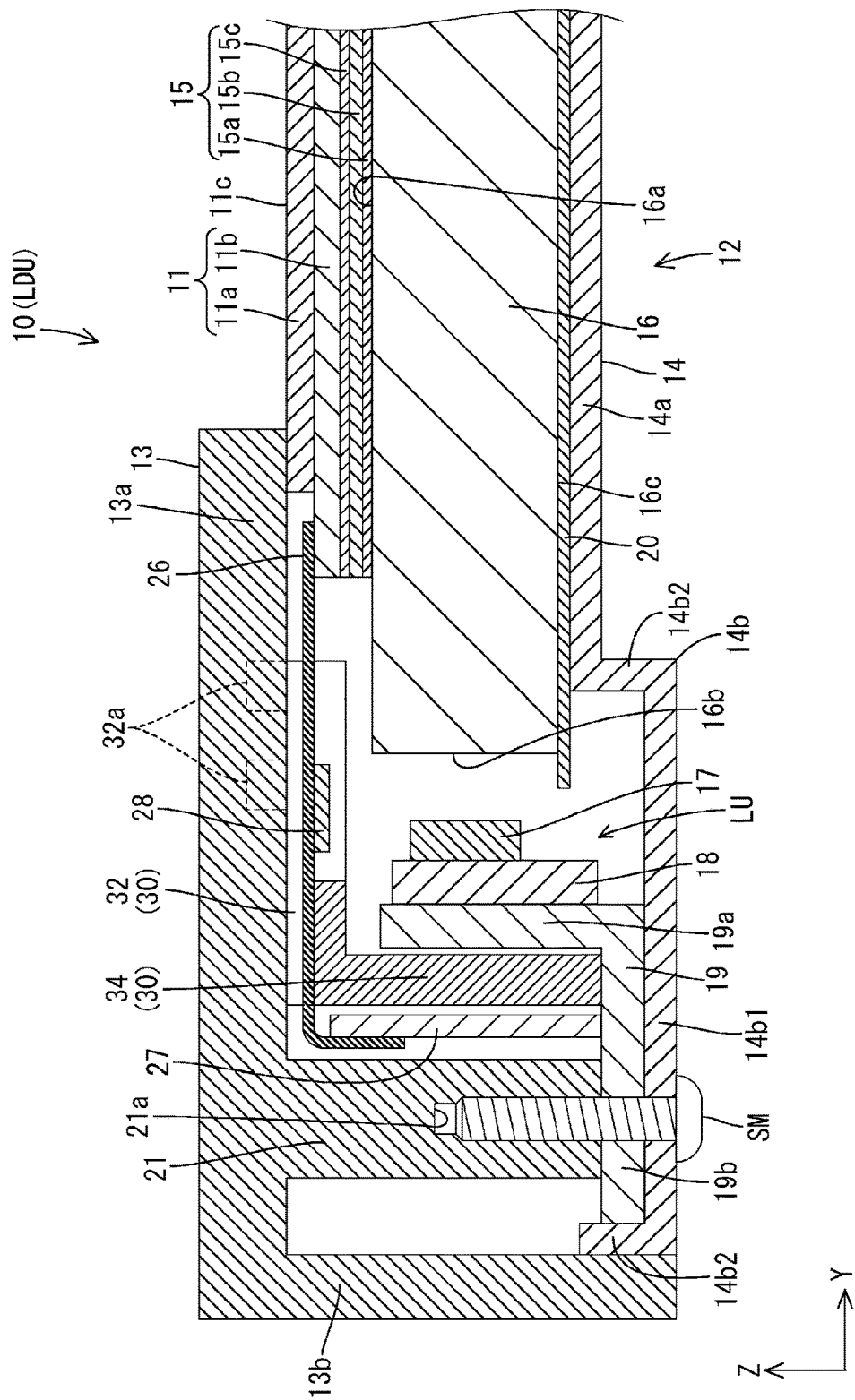
FIG. 5 is an enlarged cross-sectional view in which an area around a holder shown in FIG. 4 has been enlarged.

As shown in FIGS. 4 and 5, the array substrate 11b, which is one of the pair of substrates 11a and 11b forming the liquid crystal panel 11, is greater in size than the CF substrate 11a when seen in a plan view, and the edge of the array substrate 11b is disposed so as to protrude further out than the CF substrate 11a. Specifically, the array substrate 11b is formed so as to be slightly larger than the CF substrate 11a so that the entire periphery of the outer edges of the array substrate 11b protrudes beyond the outer edges of the CF substrate 11a. A plurality of source side terminals to which the above-mentioned source wiring lines are drawn are provided in the Y-axis direction on the long side edge on the control board CTB side (the front side in FIG. 3 and the left side in FIG. 4), which is one of the long side edges forming the outer edges of the array substrate 11b. As shown in FIG. 3, the source side flexible boards 26 (which are one kind of flexible board) are connected to the respective source side terminals. A plurality of the source side flexible boards 26 are arranged with gaps therebetween in the direction along the long side edge of the array substrate 11b, or in other words, in the X axis direction, and protrude from the long side edge of the array substrate 11b toward the outside along the Y axis direction. Meanwhile, a plurality of gate side terminals to which the above-mentioned gate wiring lines and capacitance wiring lines are drawn are provided on the short side edge of one the short side edges forming the outer edges of the array substrate 11b (the inner side shown in FIG. 3). The gate site flexible boards 46 (one type of flexible board) are connected to the respective gate side terminals. A plurality of the gate side flexible boards 46 are arranged in the direction along the short side edge of the array substrate 11b, or in other words, the Y-axis direction, and protrude from the short side edge of the array substrate 11b toward the outside along the X-axis direction.

As shown in FIG. 3, each of the flexible boards 26, 46 has a film-like base material made of a synthetic resin material (a polyimide resin or the like, for example) having insulating and flexible properties, and drivers 28, 48 (one type of panel driving part) for driving liquid crystal, the drivers being mounted on the base material. As shown in FIG. 3, each of the flexible boards 26, 46 also has a plurality of wiring patterns (not shown) formed on the base material, and the wiring patterns are connected to the drivers 28, 48 that are mounted near the center of the base material. Hereafter, the drivers 28 mounted on the source side flexible boards 26 will be referred to as source drivers 28, and the drivers 48 mounted on the gate side flexible boards 46 will be referred to as gate drivers 48. One end of the source side flexible boards 26 is crimp-connected to source side terminals of the array substrate 11b, and the other end thereof is crimp-connected to terminals of printed circuit boards 27 (one type of signal transmission substrate) that will be described later, via anisotropic conductive films (ACF), respectively. Meanwhile, one end of the gate-side flexible boards 46 is crimp-connected to gate side terminals of the array substrate 11b via anisotropic conductive films. Relay wiring (not shown) that connects the source side terminals to the gate side terminals is formed on the array substrate 11b, and the source side flexible board 26 and the source side terminals send signals (scan signals to gate wiring, capacitance signals to capacitance wiring, and the like) to the gate side terminals and the gate side flexible board 46 via the relay wiring. Thus, in the liquid crystal panel 11, an image is displayed on the display surface 11c in accordance with the signals input from the control board CTB.

The printed circuit boards 27 are connected to the above-mentioned control board CTB via FPCs (flexible printed circuits; not shown), and signals received from the control board CTB (scan signals to the gate wiring lines, data signals to the source wiring lines, capacitance signals to the capacitance wiring lines, and the like) can be transmitted to the source-side flexible boards 26. As shown in FIG. 4, the printed circuit boards 27 are formed in a narrow plate-like shape along the X-axis direction, and are disposed so that a plate surface thereof is disposed parallel to the X-axis direction and the Z-axis direction, or in other words, roughly orthogonal to the plate surface of the liquid crystal panel 11. Therefore, the source side flexible boards 26 respectively connected to the printed circuit board 25 and the liquid crystal panel 11 are disposed so as to be bent at a roughly right angle. Thus, the source side flexible boards 26 have an overall substantially L-shaped cross-section when viewed from the side. FIG. 3 shows the source side flexible boards 26 before being bent.

The printed circuit board 27 is disposed between a screw attachment part 21 of the frame 13, which will be explained later, and a second holding section 34 of the source driver holder 30. The lengthwise direction (long side direction) of the printed circuit board 25 corresponds to the X-axis direction, the widthwise direction (short side direction) of the printed circuit board 25 corresponds to the Z-axis direction, and the plate thickness direction of the printed circuit board 25 corresponds to the Y-axis direction. The printed circuit board is respectively parallel to the screw attachment portion 21 of the above-mentioned frame 13, the second holding part 34 of the source driver holder 30, and the LED substrate 18, which will be explained later. The side of the printed circuit board 27 that is opposite to the side connected to the source side flexible board 26, which is one of the edges of the printed circuit board 27 in the widthwise direction, makes surface-to-surface contact with the surface of the heat-dissipating section 19b of the heat-dissipating member 19, which will be explained later. The printed circuit board 27 is configured so as to be approximately half as long as the liquid crystal panel 11, and two printed circuit boards are disposed in a line along the long side direction (X-axis direction) of the liquid crystal panel 11. Five source side flexible boards 26 that are disposed in a line along the X-axis direction are connected to each printed circuit board 25 (see FIG. 3).

As shown in FIG. 4, the liquid crystal panel 11 described above is stacked on the front side (light-emitting side) of the optical member 15 described below, and the rear side surface thereof (outer surface of a polarizing plate on the rear side) is bonded to the optical member 15 with almost no gap therebetween. With this configuration, it is possible to prevent dust and the like from entering a space between the liquid crystal panel 11 and the optical member 15. The display surface 11c of the liquid crystal panel 11 is constituted of a display region that is in the center of the screen and that can display images, and a non-display region that is in the outer edges of the screen and that is formed in a frame-like shape that surrounds the display region. The respective terminals and the respective flexible boards 26, 46 are disposed in the non-display region. As shown in FIG. 3, a plurality of source driver holders 30 (one type of holding member), which hold the source side flexible boards 26 to the frame 13, are disposed between the liquid crystal panel 11 and the backlight device 12. The configuration of these source drive holders 30 will be explained in more detail later.

As shown in FIG. 3, the optical member 15 has a horizontally-long quadrilateral shape in a plan view in a manner similar to the liquid crystal panel 11, and the size thereof (short side dimension and long side dimension) is identical to that of the liquid crystal panel 11. The optical member 15 is stacked on the front side (light-emitting side) of the light guide plate 16 described below, and is sandwiched between the above-mentioned liquid crystal panel 11 and the light guide plate 16. The optical member 15 contains three plates that each have a sheet-like shape and that are stacked upon one another. Specific types of optical members 15 include a diffusion sheet, a lens sheet, a reflective polarizing sheet, and the like, for example, and it is possible to appropriately choose any of these as the optical member 15.

The light guide plate 16 is made of a synthetic resin (an acrylic resin such as PMMA or a polycarbonate, for example) that has a refractive index that is sufficiently higher than that of air and that is almost completely transparent (has excellent light transmission). As shown in FIG. 3, the light guide plate 16 has a horizontally-long quadrilateral shape in a plan view, in a manner similar to the liquid crystal panel 11 and the optical member 15, and has a plate-like shape that is thicker than the optical member 15. The long side direction on the main surface of the light guide plate 16 corresponds to the X axis direction, the short side corresponds to the Y axis direction, and the plate thickness direction intersecting the main surface corresponds to the Z axis direction. The light guide plate 16 is stacked on the rear side of the optical member 15, and is sandwiched between the optical member 15 and the chassis 14. As shown in FIG. 4, at a minimum, the short side dimension of the light guide plate 16 is larger than the respective short side dimensions of the liquid crystal panel 11 and the optical member 15, and the light guide plate 16 is disposed such that both edges in the short side direction (both edges along the long side direction) protrude outward beyond both edges of the liquid crystal panel 11 and the optical member 15 (so as not to overlap in a plan view). The light guide plate 16 is sandwiched in the Y axis direction between the pair of LED units LU disposed on both sides of the light guide plate 16 in the short side direction thereof. Light from the LEDs 17 enters both respective edges in the short side direction. The light guide plate 16 has the function of: receiving light from the LEDs 17, the light entering from both edges in the short side direction; propagating the light therein; and emitting the light toward the optical member 15 (front side).

Of the main surfaces of the light guide plate 16, the surface facing the front side (facing the optical member 15) is a light-exiting surface 16a where internal light is emitted towards the optical member 15 and the liquid crystal panel 11. Of the outer edge faces adjacent to the main surface of the light guide plate 16, both edge faces of the light guide plate 16 in the long side direction, which have an elongated shape along the X axis (both edge faces of the respective edges in the short side direction), are light-receiving faces 16b that directly face the respective LEDs 17 (LED substrate 18) with prescribed gaps therebetween and that receive light emitted from the LEDs 17. As shown in FIG. 4, a reflective sheet 20 is provided on the rear side of the light guide plate 16, or in other words, on an opposite surface 16c opposite to the light-exiting surface 16a (the surface facing the chassis 14). This reflective sheet 20 covers almost the entire opposite surface 16c.

The reflective sheet 20 is disposed so as to be sandwiched between the chassis 14 and the light guide plate 16 and can reflect light, which is emitted from the opposite surface 16c of the light guide plate 16 toward the rear side, back to the front side. The reflective sheet 20 is made of a synthetic resin, and the surface thereof has a highly reflective white color. The short side dimension of the reflective sheet 20 is larger than the short side dimension of the light guide plate 16, and the respective edges thereof protrude beyond the light-receiving faces 16b of the light guide plate 16 toward the LEDs 17. Light that travels diagonally from the LEDs 17 towards the chassis 14 can be reflected efficiently via the protruding portions of the reflective sheet 20, thereby directing the light toward the light-receiving faces 16b of the light guide plate 16. On at least one of the light-exiting surface 16a and the opposite surface 16c in the light guide plate 16, reflective parts (not shown) that reflect internal light or diffusion parts (not shown) that diffuse internal light are patterned so as to have a prescribed surface distribution, thereby controlling the light emitted from the light-exiting surface 16a so as to have an even distribution across the surface.

Next, the LEDs 17, a LED substrate 18, and a heat-dissipating member 19 that constitute the LED unit LU will be explained in that order. The LEDs 17 that form a part of the LED unit LU have a configuration in which an LED chip (not shown) is sealed via a resin on a substrate section that is affixed to the LED substrate 18. The LED chip mounted on the substrate section has one type of primary light-emitting wavelength, and specifically, only emits blue light. On the other hand, the resin that seals the LED chip has a phosphor dispersed therein, the phosphor emitting light of a prescribed color by being excited by the blue light emitted from the LED chip. This combination of the LED chip and the phosphor emits light that has an overall white color. As the phosphor, a yellow phosphor that emits yellow light, a green phosphor that emits green light, and a red phosphor that emits red light, for example, can be appropriately combined, or only one phosphor can be used. Each of the LEDs 17 is of a so-called top-emitting type in which the face opposite to the face mounted onto the LED substrate 18 (side facing the light-receiving face 16b of the light guide plate 16) is the primary light-exiting surface.

As shown in FIG. 3, the LED substrate 18 that forms a part of the LED unit LU has a narrow plate-like shape that extends along the long side direction (the X-axis direction, the long side direction of the light-receiving faces 16b) of the light guide plate 16, and is housed in the frame 13 and the chassis 14 such that the plate surface is parallel to the X-axis direction and the Z-axis direction, or in other words, is parallel to the light-receiving face 16b of the light guide plate 16. The length of the LED substrate 18 is approximately half that of the long side dimension of the light guide plate 16. On the inner surface of the LED substrate 18, or in other words, on the surface facing the light guide plate 16 (surface opposing the light guide plate 16), the LEDs 17 having the above-mentioned configuration are mounted. These surfaces are considered to be mounting surfaces. A plurality of the LEDs 17 are disposed in a row (in a line), with a prescribed gap therebetween, along the length direction (the X axis direction) of the mounting surfaces of the LED substrate 18. That is, a plurality of LEDs 17 are arranged at intervals along the long side direction on both longer side edges of the backlight device 12. The intervals between adjacent LEDs 17 along the X axis direction are substantially equal to each other, or in other words, the LEDs 17 are arranged at substantially the same pitch. The alignment direction of the LEDs 17 corresponds to the long side direction (the X axis direction) of the LED substrate 18. A wiring pattern (not shown) made from a metal film (such as copper foil) is formed on the mounting surfaces of the LED substrate 18. The wiring pattern extends in the X-axis direction across the group of LEDs 17 so as to connect adjacent LEDs 17 in series. Driving power is provided to the respective LEDs 17 by connecting the terminals formed on both edges of the wiring pattern to the power supply board PWB via a wiring member such as a connector, electric wiring, or the like.

Figure 6:
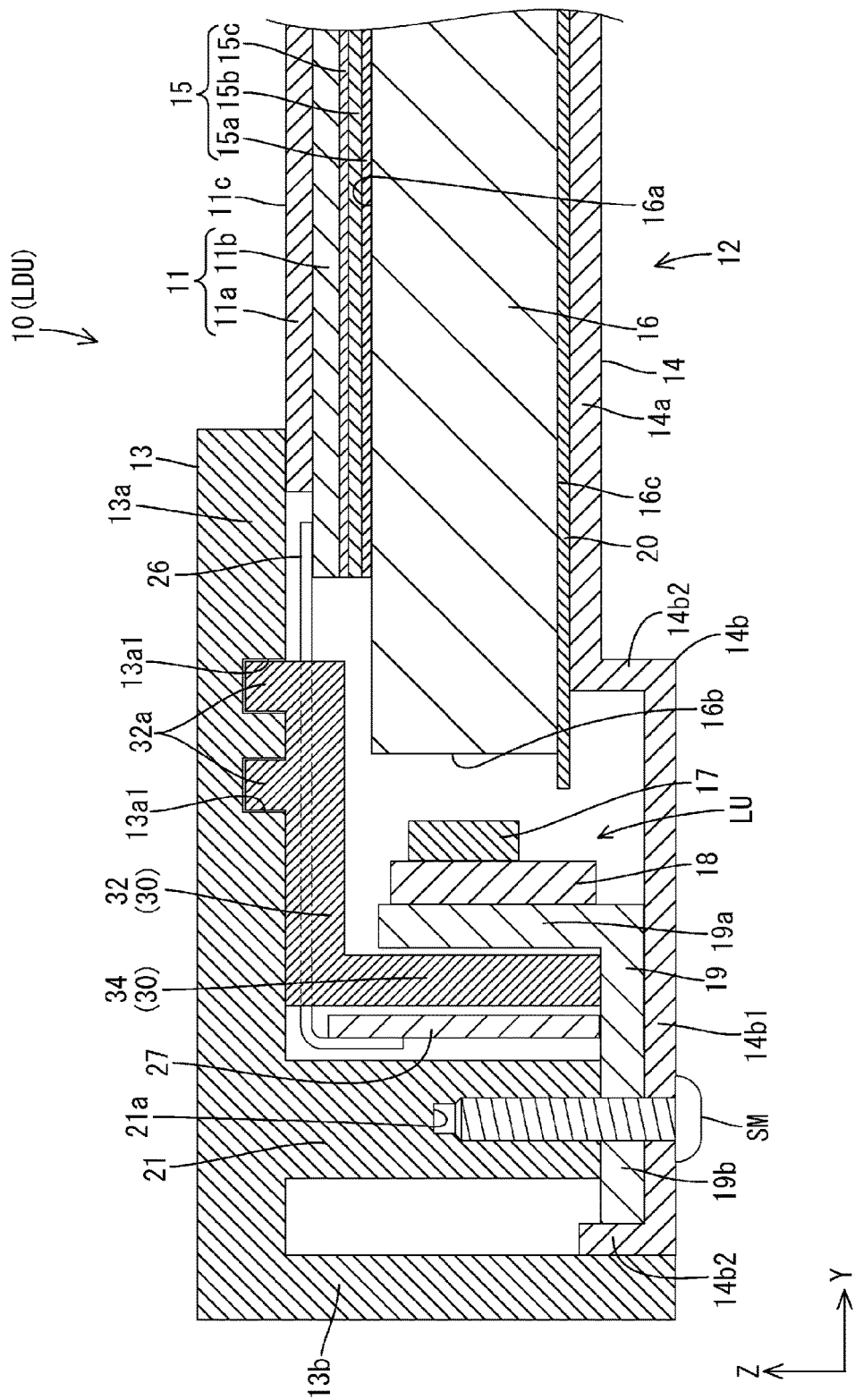
FIG. 6 is an enlarged cross-sectional view that shows another cross-sectional configuration of a liquid crystal display device 10 along the short side direction.

The heat-dissipating member 19 that forms a part of the LED unit LU is made from a metal that has excellent thermal conductivity, such as aluminum or the like. As shown in FIGS. 5 and 6, the heat-dissipating member 19 has a LED attachment section 19a (one type of light source attachment section) on which the LED substrate 18 is attached and a heat-dissipating section 19b that makes surface-to-surface contact with the surface of the chassis 14. In a cross section, these two parts together have a bent shape that is approximately in the shape of an "L". The length of the heat-dissipating member 19 is substantially the same as the length of the above-mentioned LED substrate 18. The LED attachment section 19a that forms a part of the heat-dissipating member 19 has a plate-like shape that is parallel to the surface of the LED substrate 18 and the light-receiving face 16b of the light guide plate 16. The long side direction corresponds to the X-axis direction, the short side direction corresponds to the Z-axis direction, and the thickness direction corresponds to the Y-axis direction, respectively. The LED substrate 18 is attached to the inner surface of the LED attachment section 19a, namely the surface facing the light guide plate 16. Both edges of the LED attachment section 19a in the short side direction protrude outward from both edges of the LED substrate 18 in the Z-axis direction. The outer surface of the LED attachment section 19a, or in other words, the surface opposite to the surface to which the LED substrate 18 is attached, is formed so as to face the second holding section 34 of the source driver holder 30, which will be explained later. The LED attachment section 19a is configured to rise from the inner edge, or in other words, the edge closer to the LEDs 17 (light guide plate 16), of the heat-dissipating section 19b described below. The LED attachment section 19a rises toward the front side, or in other words, toward the frame 13 along the Z-axis direction (direction to which the liquid crystal panel 11, the optical member 15, and the light guide plate 16 are stacked.

As shown in FIGS. 5 and 6, the heat-dissipating section 19b is formed in a plate-like shape that is parallel to the surface of the chassis 14, and the long side direction of the heat-dissipating section 19b corresponds to the X axis direction, the short side direction corresponds to the Y axis direction, and the thickness direction corresponds to the Z axis direction, respectively. The heat-dissipating section 19b protrudes along the Y-axis from the rear edge of the LED attachment section 19a, or in other words, from the edge closer to the chassis 14 toward the outside, or in other words, in the direction opposite to the light guide plate 16. The long side dimension of the heat-dissipating section 19b is substantially the same as that of the LED attachment section 19a. The entire surface of the rear face of the heat-dissipating section 19b, or in other words, the entire surface facing the chassis 14, makes surface-to-surface contact with the surface of the chassis 14. Furthermore, the inner surface of the heating dissipating section 19b, or in other words, the surface that is opposite of the surface that contacts the chassis 14, is formed so as to face the screw attachment section 21 of the frame 13, which will be explained later, and contacts the protruding edge face of the screw attachment section 21. That is, the heat-dissipating section 19b is sandwiched (interposed) between the chassis 14 and the screw attachment section 21 of the frame 13. Thus, heat generated when the LEDs 17 are lit is effectively dispersed to the outside of the liquid crystal display device 10, which means that very little heat will become trapped inside the device. This is due to the fact that the heat is transferred to the chassis 14 and the frame 13, which has the screw attachment section 21, via the LED substrate 18, the LED attachment section 19a, and the heat-dissipating section 19b. The heat-dissipating section 19b is configured to be attached to and held by the screw attachment section 21 via a screw member SM, and has an insertion hole 19b1 (see FIG. 9) for the screw member SM to pass through.

The configuration of the frame 13 and the chassis 14, which form the exterior of the liquid crystal display device 10, will be explained next. The frame 13 and the chassis 14 are both made of a metal such as aluminum, for example, and have higher mechanical strength (rigidity) and thermal conductivity compared to a case in which the frame 13 and the chassis 14 are made of a synthetic resin. As shown in FIG. 3, the frame 13 and the chassis 14 house the liquid crystal panel 11, the optical member 15, and the light guide plate 16, which are stacked on top of one another, by sandwiching these stacked components from the front side and the rear side, while also housing the pair of LED units LU on both edges (both long side edges) in the short side direction thereof.

As shown in FIG. 3, the frame 13 is formed in a substantially horizontally-long frame shape so as to enclose the display region on the display surface 11c of the liquid crystal panel 11. The frame 13 has a frame section 13a that is parallel to the display surface 11c of the liquid crystal panel 11 and that presses against the surface of the liquid crystal panel 11, and side walls 13b that extend from the outer edges of the frame section 13a toward the rear of the device. The frame 13 also has a substantially "L" shape in a cross-sectional view. The frame section 13a is formed in a horizontally-long frame shape similar to the shape of the outer portion (non-display region, frame portion) of the liquid crystal panel 11, and holds the liquid crystal panel 11 by pressing against the front surface of the liquid crystal panel 11 across almost all of the outer edges of the liquid crystal panel 11. The frame section 13a is made wide enough to cover the optical member 15 and the outer portion of the light guide plate 16 that are disposed on the outside of the outer edges of the liquid crystal panel 11 in the emission direction, and the respective LED units LU from the front side, and also covers the outer edges of the liquid crystal panel 11. The front outer surface of the frame section 13a (surface opposite to the surface facing the liquid crystal panel 11) is exposed to the outside on the front side of the liquid crystal display device 10 similar to the display surface 11c of the liquid crystal panel 11, and, together with the display surface 11c of the liquid crystal panel 11, constitutes the front surface of the liquid crystal display device 10. Meanwhile, the side walls 13b have a substantially rectangular column-like shape that protrudes from the outer portion of the frame section 13a toward the rear. The side walls 13b can enclose the liquid crystal panel 11, the optical member 15, the light guide plate 16, and the LED units LU that are housed therein along the entire periphery thereof, and also can enclose the chassis 14 on the rear side along almost the entire periphery thereof. The outer surfaces of the side walls 13b along the circumferential direction of the liquid crystal display device 10 are exposed to the outside in the circumferential direction of the liquid crystal display device 10, and constitute the top face, the bottom face, and the side faces of the liquid crystal display device 10.

As shown in FIG. 4 and FIG. 6, the screw attachment section 21 to which the screw member SM is attached is integrally formed in a location in the frame section 13a that is further to the inside (closer to the light guide plate 16) than the side walls 13b. The screw attachment section 21 protrudes from the inner surface of the frame section 13a toward the rear in the Z axis direction, and each screw attachment section 21 is formed in a substantially block shape that is horizontally long and that extends along the respective sides of the frame section 13a (the X axis direction or the Y axis direction). As shown in FIGS. 4 and 6, a groove 21a that opens towards the rear and that allows the screw member SM to be fastened is formed in the screw attachment section 21. As shown in FIGS. 5 and 6, prescribed gaps are provided between the LED attachment section 19a and a pair of the screw attachment sections 21 on the long side. As shown in FIG. 4, a space is provided between the heat-dissipating member 19, from among a pair of heat-dissipating members 19, that is positioned so as to overlap the source side flexible board 26 when viewed horizontally, and the screw attachment member 21 to which that heat-dissipating member 19 is attached. The printed circuit board 27 and a second heat-dissipating section 34 of the source driver holder 30 can be housed in this space. On the printed circuit board 27, a plurality of the source side flexible boards 26 are arranged at intervals along the long side direction thereof, and the other ends of the flexible boards 26 are respectively connected to the printed circuit board 27. The printed circuit board 27 also has a connector (not shown) to which one end of the FPC is inserted and connected, and the other end of the FPC is drawn to the outside on the rear side of the chassis 14 through an FPC insertion hole (not shown) formed in the chassis 14, and is connected to the control board CTB.

As shown in FIG. 3, the chassis 14 is formed in a substantially shallow plate shape that is horizontally long as a whole so as to almost entirely cover the light guide plate 16, the LED units LU, and the like from the rear side. The rear outer surface of the chassis 14 (surface opposite to the side facing the light guide plate 16 and the LED units LU) is exposed to the outside on the rear side of the liquid crystal display device 10, and constitutes the rear surface of the liquid crystal display device 10. The chassis 14 has a bottom plate 14a formed in a horizontally-long quadrangular shape in a similar manner to the light guide plate 16, and a pair of LED housing sections 14b that house the LED units LU and protrude from the respective long side edges of the bottom plate 14a toward the rear in a step-like shape, respectively.

As shown in FIGS. 3 and 4, the bottom plate 14a is formed in a flat plate shape that can receive from the rear side the majority of the central portion (which does not include the respective edge portions in the short side direction) of the light guide plate 16 in the short side direction, and thus forms a receiving section for the light guide plate 16. Both edges of the bottom plate 14a in the long side direction respectively extend farther outward than the edges in the long side direction of the light guide plate 16, and the bottom plate 14a includes a pair of screw mounting sections 14a1 to which the screw member SM that fixes the frame 13 and the chassis 14 is mounted from the outside (see FIG. 3).

As shown in FIGS. 3 and 4, the LED housing sections 14b are disposed so as to sandwich the bottom plate 14a from the respective long sides, and can house the LED units LU therein by being recessed one level closer to the rear than the bottom plate 14a. The LED housing sections 14b include a screw mounting section 14b1 that is parallel to the bottom plate 14a and to which the screw member SM is mounted from outside, and a pair of side plates 14b2 which respectively rise from the both edges of the screw mounting section 14b1 toward the front surface. Among the pair of side plates 14b2, the side plate 14b2 farthest to the inside continues to the bottom plate 14a. On the screw mounting section 14b1 of the LED housing section 14b, the heat-dissipating section 19b of the heat-dissipating member 19 of the LED unit LU is disposed so as to make surface-to-surface contact with the inner surface of the screw mounting section 14b1. Additionally, the outer side plate 14b2 of the LED housing section 14b has the function of fixing the position of the chassis 14 with respect to the frame 13 in the Y-axis direction by being inserted into a gap between the long side screw attachment section 21 and the side wall 13b.

The configuration of the source driver holder 30, which is an important component of the present embodiment, will be explained next. The source driver holder 30 is a member for holding the source driver 28 and the source side flexible boards 26 with respect to the frame 13. Two source driver holders 30 are disposed along the long side direction (X-axis direction) of the liquid crystal display device 10 between the liquid crystal panel 11 and the backlight device 12. The source driver holders 30 are disposed in such a way as to correspond to the two printed circuit boards 27 connected to the liquid crystal panel 11 via the source side flexible boards 26. As shown in FIGS. 5 and 6, the source driver holders 30 have: a first holding section 32 disposed along the frame section 13a of the frame 13; and a second holding section 34 that is disposed along the side walls 13b of the frame 13 and that extends from an edge of the first holding section 32 to the side (rear side, side facing the chassis 14) opposite of the display surface 11c side of the liquid crystal panel 11.

The first holding section 32 that forms a part of the source driver holder 30 has a narrow plate-like shape that extends along the long side direction (the X-axis direction, the long side direction of the liquid crystal display device 10) of the frame 13. The plate surface is disposed so as to be parallel to the X-axis direction and the Y-axis direction, or in other words, disposed along the frame section 13a of the frame 13, and is disposed so as to overlap the frame section 13a in a plan view. Specifically, the first holding section 32 is disposed between the liquid crystal panel 11 and the screw attachment section 21 of the frame 13 (specifically, a position slightly separated from the edges of the liquid crystal panel 11) in the short side direction thereof (the Y-axis direction), and is disposed between the heat-dissipating member 19 and the frame section 13a of the frame 13 in the thickness direction thereof (the Z-axis direction). Each of the first holding sections 32, in a manner similar to each of the source side flexible boards 26, is configured so that the length (the dimension in the X-axis direction) of the respective first holding sections 32 is about half that of the long side dimension of the light guide plate 16. As shown in FIG. 5, the first holding sections 32 are disposed so as to overlap the source drivers 28 mounted on the source side flexible boards 26 in a plan view along the short side direction (the Y-axis direction) of the liquid crystal display device 10.

The second holding section 34, which forms a part of the source driver holder 30, extends from the outer edge (the edge facing the side wall side of the frame 13) of the first holding section 32 in the short side direction thereof (the Y-axis direction) toward the side (rear side, side facing the chassis 14) opposite of the liquid crystal panel 11. The second holding section 34 has a narrow plate-like shape that extends along the long side direction (the X-axis direction, the long side direction of the liquid crystal display device 10) of the frame 13, and is disposed so as to be parallel to the X-axis direction and the Z-axis direction of the plate, or in other words, along the side walls 13b of the frame 13, and to be orthogonal to the plate surface of the first holding section 32. Specifically, the second holding section 34 is disposed between the printed circuit board 27 and the LED attachment section 19a of the heat-dissipating member 19 in the thickness direction thereof (the Y-axis direction), and is disposed between the frame section 13a of the frame 13 and the heat-dissipating section 19b of the heat-dissipating member 19 in the short side direction thereof (the Z-axis direction). One end (the end facing the chassis 14) of the second holding section 34 abuts the heat-dissipating section 19b of the heat-dissipating member 19 in the short side direction thereof (the Z-axis direction).

Figure 7:
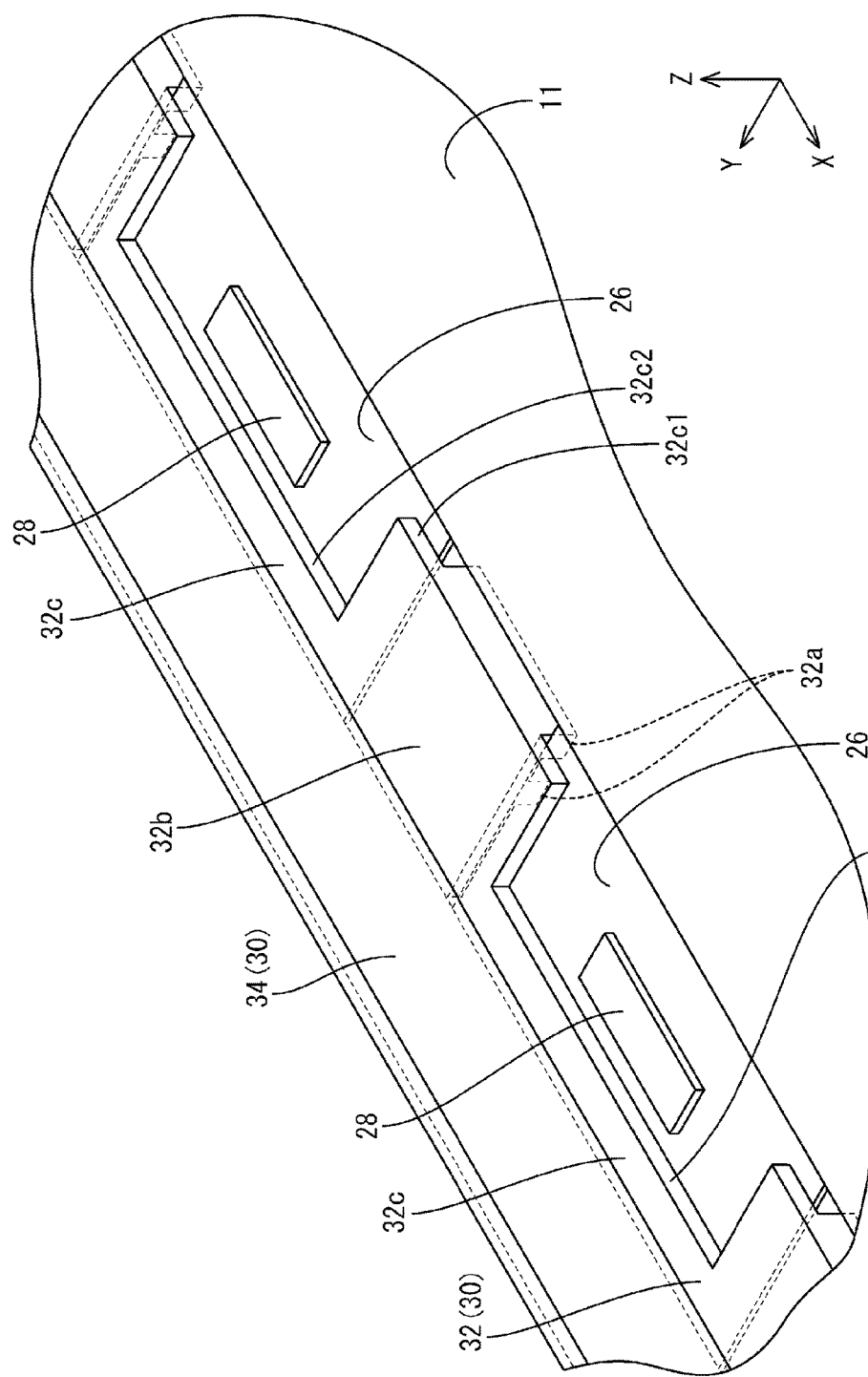
FIG. 7 is a perspective view of a portion of the flexible board and a portion of the holder, as viewed from a front side.

Next, the first holding section 32 that forms a part of the source drive holder 30 will be explained in detail. As shown in FIGS. 6 and 7, the thickness (the dimension in the Z-axis direction) of the first holding section 32 is relatively small at locations (hereafter referred as thin plate portions 32c) where the first holding section 32 overlaps the source side flexible boards 26 in a plan view. In locations (hereafter referred to as thick plate portions 32b) where the first holding section 32 does not overlap the source side flexible boards 26 in a plan view, the thickness of the first holding member 32 is relatively large. The thin plate portions 32c of the first holding section 32 hold the source side flexible boards 26 as a result of the source side flexible boards 26 being mounted on the surface thereof. As shown in FIG. 7, the thin plate portions 32c of the first holding section 32 have wide regions 32c1 that have a relatively large width (the Y-axis dimension), and narrow regions 32c2 that have a relatively narrow width. By having such wide regions 32c1 and narrow regions 32c2, the thin plate portions 32c do not overlap the source driver 28 in the thickness direction (the Z-axis direction) of the source side flexible boards 26. The thick plate portions 32b of the first holding section 32 are configured so as to continue to the wide regions 32c1 of the thin plate portion 32c, and the thick plate portions 32b have the same width as the wide regions 32c1 (see FIG. 7). Therefore, the first holding member 32 is configured such that a plurality of wide regions 32c1 and a plurality of narrow regions 32c2 are alternately disposed along the long side direction (the X-axis direction) thereof.

Figure 8:
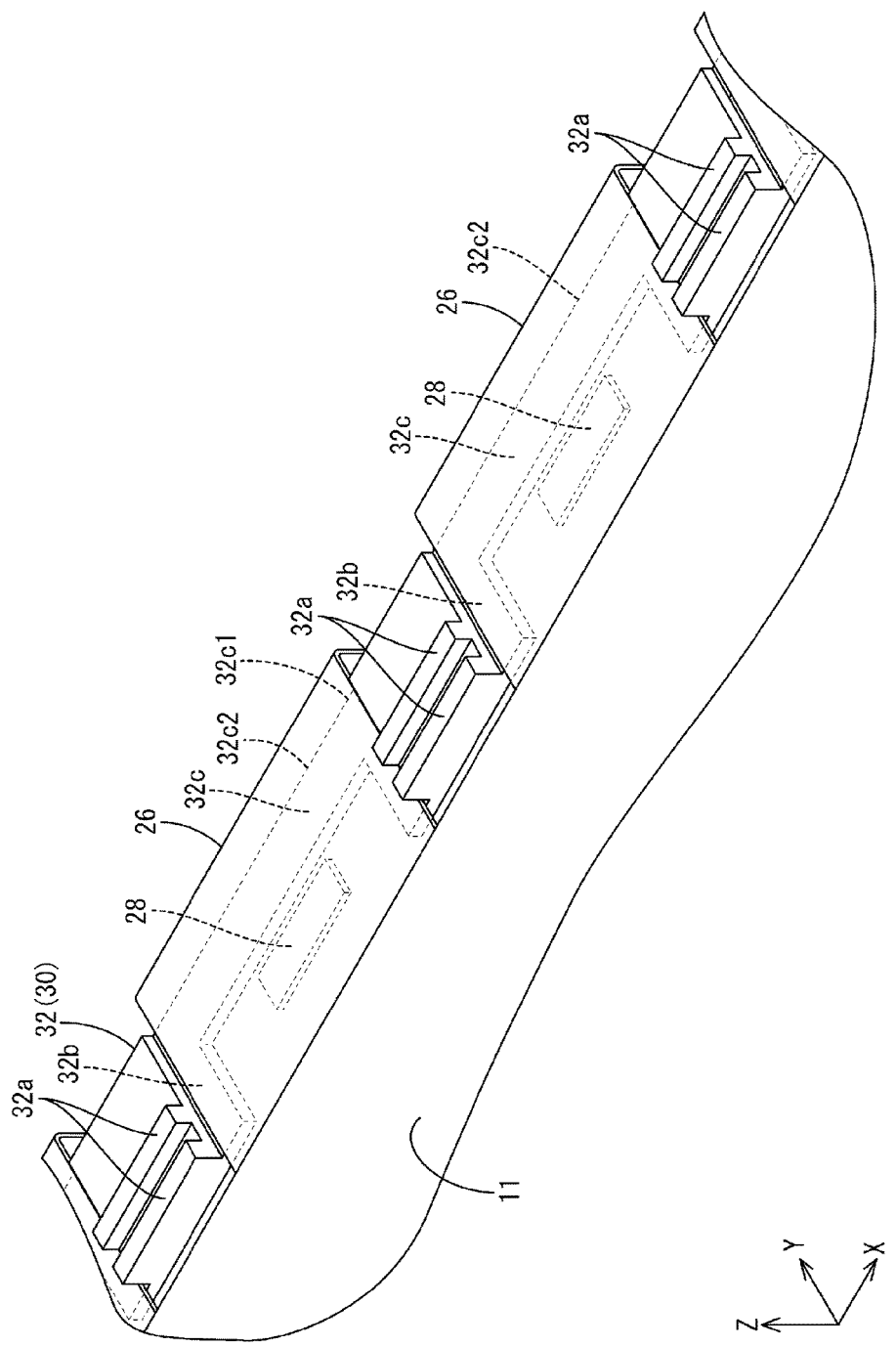
FIG. 8 is a perspective view of a portion of the flexible board and a portion of the holder, as viewed from a back side.

As shown in FIGS. 6 and 8, protrusions 32a are disposed in the thick plate portions 32b of the first holding section 32, the protrusions 32a slightly protruding from the plate surface on the front side (the side facing the frame section 13a of the frame 13) toward the frame section 13a of the frame 13. FIG. 6 shows a cross-sectional configuration of a liquid crystal display device 10, the cross-section passing through the protrusions 32a in the short-side direction (Y-axis direction) of the liquid crystal display device 10. The protrusions 32a have a narrow rib shape that extends along the long side direction (the X-axis direction) of the first holding section 32, and are disposed side-by-side in the short side direction (the Y-axis direction) of the first holding section 32 and with gaps therebetween in the long side direction (the X-axis direction) of the first holding section 32. In other words, each protrusion 32a is disposed between adjacent source side flexible boards 26, 26. Meanwhile, as shown in FIG. 6, engaging recessed sections 13a1 that can engage with the protrusions 32a are disposed in the portions of the frame section 13a of the frame 13 that face the protrusions 32a. The source driver holder 30 attaches to and holds the frame 13 by the protrusions 32a of the first holding section 32 engaging the engaging recessed sections 13a1 of the frame 13.

The present embodiment has the above-mentioned configuration, and the operation thereof will be explained next. As mentioned above, the source side flexible boards 26 on which the source driver 28 and the source driver 28 are mounted are held to the frame by the source driver holder 30. This is accomplished by the source driver holder 30 being attached to the frame 13. Specifically, the source side flexible boards 26 are held by means of a portion of the first holding section 32, which forms a part of the source driver holder 30, supporting a portion of the source side flexible boards 26. The printed circuit board 27 is supported in the width direction thereof (the Y-axis direction) by the second holding section 34, which forms a part of the source driver 28, being disposed so as to face the printed circuit board 27.

The source driver holder 30 in the present embodiment has an L-shape in a cross-sectional view as a result of having the second holding section 34 that extends from the first holding section 32. As a result, compared to instances in which the source driver holder 30 has only a first holding section 32 (a plate-like member only), having a second holding section disposed on the first holding section 32 to function as a rib leads to an increase in the strength of the source driver holder 30. Thus, bending of the source driver holder 30 due to insufficient strength can be prevented or controlled during the manufacturing process and the like of the liquid crystal display device 10.

Figure 9:
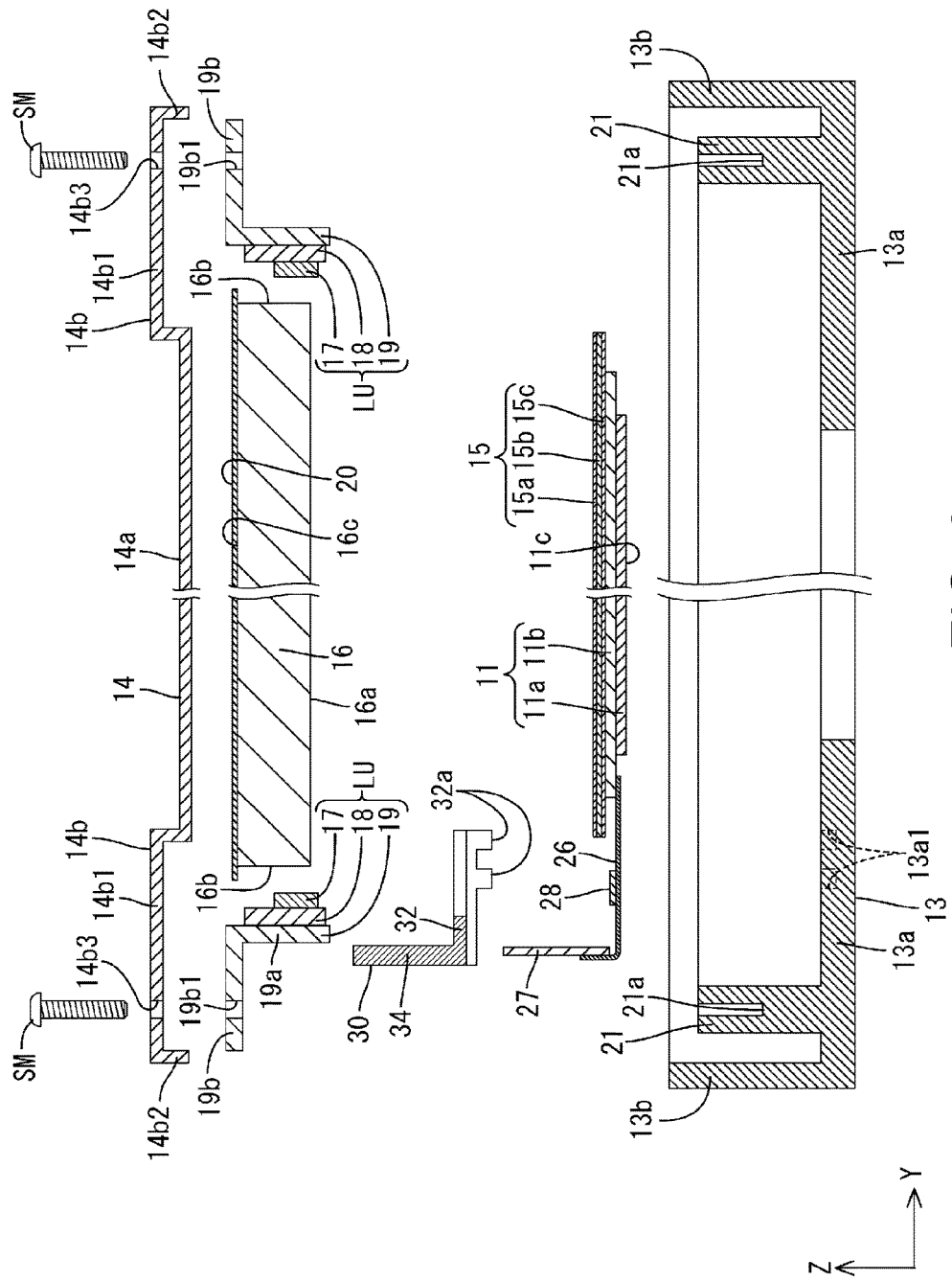
FIG. 9 is a cross-sectional view showing a cross-sectional configuration of the liquid crystal display device along the short side direction, the figure illustrating assembly steps for respective constituting components of a liquid crystal display unit in the liquid crystal display device.

Next, the manufacturing process of the liquid crystal display device 10 will be explained with reference to FIG. 9. During the manufacturing process of the liquid crystal display device 10, the members of the liquid crystal display device 10 are assembled one after another starting from the surface side thereof (top side in FIG. 4). Specifically, the liquid crystal panel 11 is mounted on the rear of the frame 13 by inverting the frame 13 and fixing the position of the liquid crystal panel 11 so that the inner edges of the frame section 13a of the frame 13 are parallel to the outer edges of the display surface 11c of the liquid crystal panel 11. In such a case, the source side flexible boards 26 connected to the liquid crystal panel 11, the source driver 28, and the printed circuit board 27 are disposed on the inside of the frame 13 as a result of the liquid crystal panel 11 being mounted on the rear of the frame 13. Next, the position of the optical member 15 is fixed in a manner similar to the liquid crystal panel 11, and is mounted on the rear of the liquid crystal panel 11. The source driver holder 30 is then attached to the frame 13 from the rear of the source side flexible boards 26. Specifically, the protrusions 32a in the first holding section 32 of the source driver holder 30 are attached to the engaging recessed sections 13a1 of the frame section of the frame 13. As a result, the source side flexible boards 26, the source driver 28, and the printed circuit board 27 are respectively held to the frame 13 by the source driver holder 30.

Next, the light guide plate 16 is disposed from the rear of the optical member 15 in such a way that the light-exiting surface 16a of the light guide plate 16 abuts the optical member 15, and the pair of LED units LU are respectively attached in such a way that the heating dissipating section 19b of the heat-dissipating member 19 abuts the screw attachment section 21 of the frame 13. If the source driver holder 30 is not assembled before the LED units LU, it is possible that if the source side flexible boards 26 are bent, the printed circuit board 27 connected to the source side flexible boards 26 may face inward (the direction opposite of the side-wall sections 13b of the frame 13). In such a case, it becomes easy for the LED units LU to interfere with the printed circuit board 27 when the LED units LU are attached on the side on which the source side flexible boards 26 are disposed. This makes it difficult to attach the LED units LU. With this in mind, in the present embodiment, as a result of the source driver holder 30 being attached prior to the LED units LU, the printed circuit board 27 is supported in the thickness direction thereof (the Z-axis direction) via the second holding section 34 of the source driver holder 30. Thus, the LED units LU can be easily attached to the side on which the source side flexible boards 26 are disposed. After this, the chassis 14 is attached, the screw member SM is inserted from the rear of the chassis 14 into a screw hole 14b3 in the chassis 14 and an insertion hole 19b1 in the heat-dissipating member 19 and fastened thereon, and the chassis 14 is attached to the frame 13. This completes the assembly of the liquid crystal display device 10.

As explained above, in the liquid crystal display device 10 according to the present embodiment, the strength of the source driver holder 30 can be increased by having the second holding section 34 that extends from the first holding section 32 along the side walls 13b of the frame 13 function as a rib disposed on the first holding section 32 of the source driver holder 30. Thus, bending of the source driver holder 30 due to insufficient strength can be prevented or suppressed during the manufacturing process and the like of the liquid crystal display device 10 according to the present embodiment. As explained above, in the display device 10 of the present embodiment, the strength of the holding member that holds the source side flexible boards 26 is increased, thereby making it possible to prevent or suppress warping of the source driver holder 30 even if the display device does not have a cabinet, as is the case in the present embodiment.

In addition, the liquid crystal display device 10 according to the present embodiment is connected to the other end of the source side flexible boards 26, and further includes the printed circuit board 27 that transmits signals to the source driver 28. The printed circuit board 27 is configured so as to be disposed between the side walls 13b of the frame 13 and the second holding section 34 of the source driver holder 30. In this way, the printed substrate 27 is supported because the printed circuit board 27 is disposed between the side walls 13b of the frame 13 and the second holding section 34 of the source driver holder 30. As a result, the printed circuit board 27 can be prevented from tilting toward the side of the frame 13 opposite to the side walls 13b during the manufacturing process and the like of the liquid crystal display device 10. Thus, when a member such as the LED unit LU is disposed on the side of the frame 13 opposite to the side walls 13b so as to face the signal printed circuit board 27, the member can be prevented from interfering with the printed circuit board 27 during the manufacturing process and the like of the liquid crystal display device 10.

In addition, in the liquid crystal display device 10 according to the present embodiment, the first holding section 32 of the source driver holder 30 can be prevented from being superimposed on the source driver 28 in the thickness direction (Z-axis direction) of the source side flexible boards 26. This is a result of the first holding section 32 having wide regions 32c1 and narrow regions 32c2. As a result of the liquid crystal display device 10 being configured in such a way, the source driver holder 30 can be prevented from interfering with the source driver 28.

Additionally, the liquid crystal display device 10 according to the present embodiment is configured so as to be provided with the plurality of source side flexible boards 26. The first holding section 32 of the source driver holder 30 protrudes toward the frame 13 and has the protrusions 32a that attach to the frame 13. The protrusions 32a are configured so as to be disposed between adjacent source side flexible boards 26, 26. In this way, since the portions of the source driver holder 30 that attach to the frame 13 are the protrusions 32a protruding toward the frame 13, the source driver holder 30 can be easily attached to the frame 13 and the protrusions 32a can be prevented from interfering with the source side flexible boards 26.

The liquid crystal display device 10 according to the present embodiment is configured to include: the LED substrate 18 on which the plurality of LEDs 17 are mounted; and the heat-dissipating member 19 to which the LED substrate is attached. Additionally, the second holding section 34 of the source driver holder 30 abuts the heat-dissipating section 19b of the heat-dissipating member 19. As a result of such a configuration, the heat-dissipating member 19 is better able to dissipate heat, and the heat-dissipating member 19 is able to support the second holding section 34 of the source driver holder 30.

In addition, the liquid crystal display device according to the present embodiment is configured so as to include the chassis 14, which is disposed on the side opposite of the frame 13 so as to face the source driver holder 30, and has the bottom plate 14a. The entire surface of the heat-dissipating section 19b of the heat-dissipating member 19 abuts the bottom plate 14a of the chassis 14. As a result of such a configuration, a large portion of the heat transmitted from the LEDs 17 to the heat-dissipating member 19 is released toward the chassis 14 via the heat-dissipating section 19b of the heat-dissipating member 19. This makes it difficult for the heat to be transmitted to the accessible frame 13.

Modification Example of Embodiment 1

Figure 10:
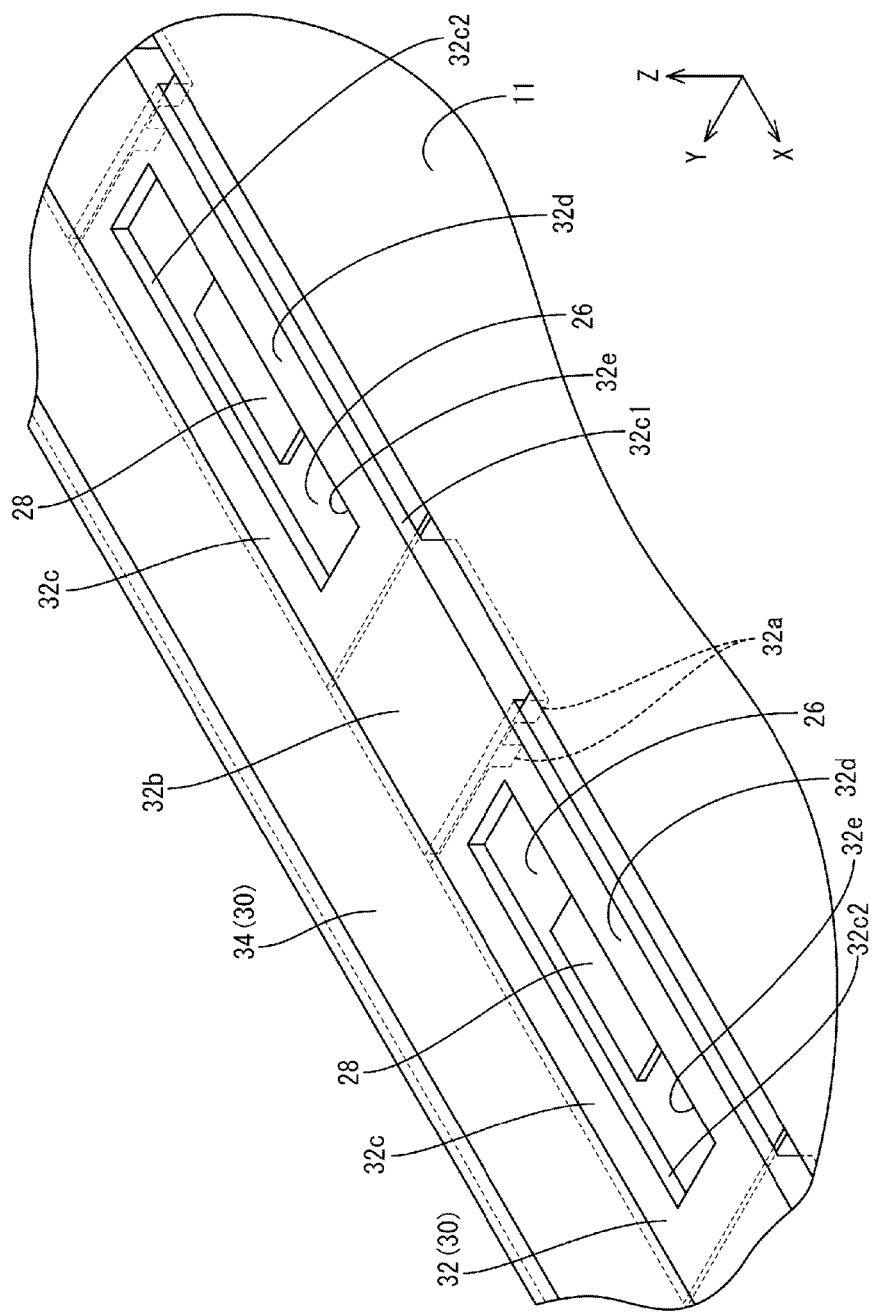
FIG. 10 is a perspective view of a portion of a flexible board and a portion of a holder, as viewed from a front side, of a modification example of Embodiment 1.
Figure 11:
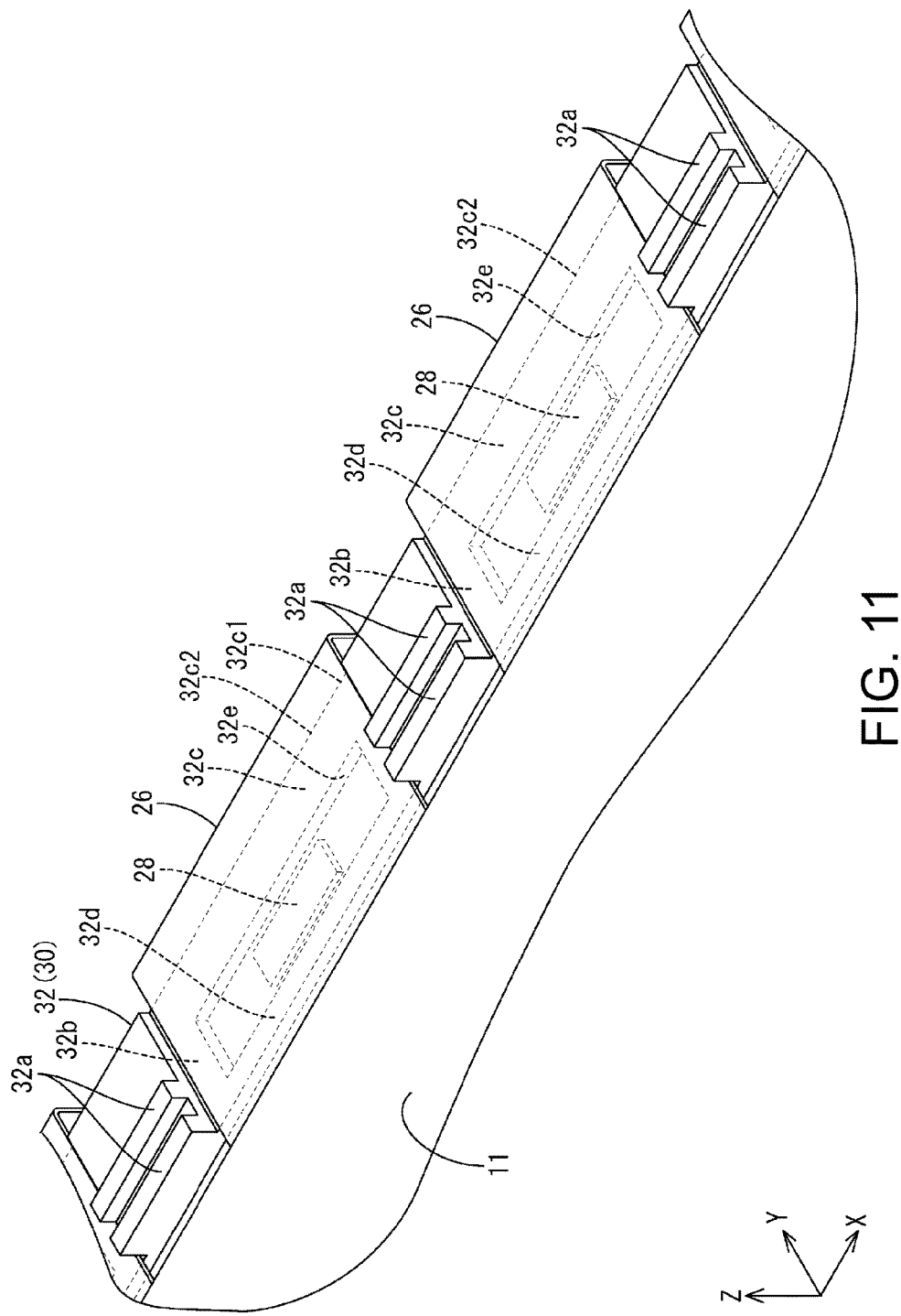
FIG. 11 is a perspective view of a portion of the flexible board and a portion of the holder, as viewed from a back side, of a modification example of Embodiment 1.

A modification example of Embodiment 1 will be explained with reference to FIGS. 10 and 11. The various parts in FIGS. 10 and 11 that correspond to parts in FIGS. 7 and 8 will have identical reference characters to those in FIGS. 7 and 8. As shown in FIGS. 10 and 11, in the modification example of Embodiment 1, spanning sections 32d that span the space between adjacent wide regions 32c1 are disposed between wide regions 32c1 and narrow regions 32c2 of a first holding section 32 of a source driver holder 30, the spanning sections 32d being provided separately from the narrow regions 32c2. In narrow plate sections 32c of the first holding section 32, openings 32e are provided between the narrow regions 32c2 and the spanning sections 32d, and source drivers 28 are provided inside the openings 32e in a plan view of the liquid crystal display device 10. Due to the configuration of the present modification, the space between adjacent wide regions 32c1 is reinforced by the spanning sections 32d. This means that the source driver holder 30 does not interference with the source driver 28 and that the source driver holder 30 is further strengthened.

Embodiment 2

Embodiment 2 will be described with reference to FIG. 12. Embodiment 2 differs from Embodiment 1 in two ways: the way in which a source driver holder 130 is attached, and the configuration of a heat-dissipating member 119. Other elements are similar to those of Embodiment 1, and therefore, descriptions of the configurations, the operation, and the effects will be omitted. Parts in FIG. 12 that have 100 added to the reference characters of FIG. 5 are the same as the corresponding parts described in Embodiment 1.

Figure 12:
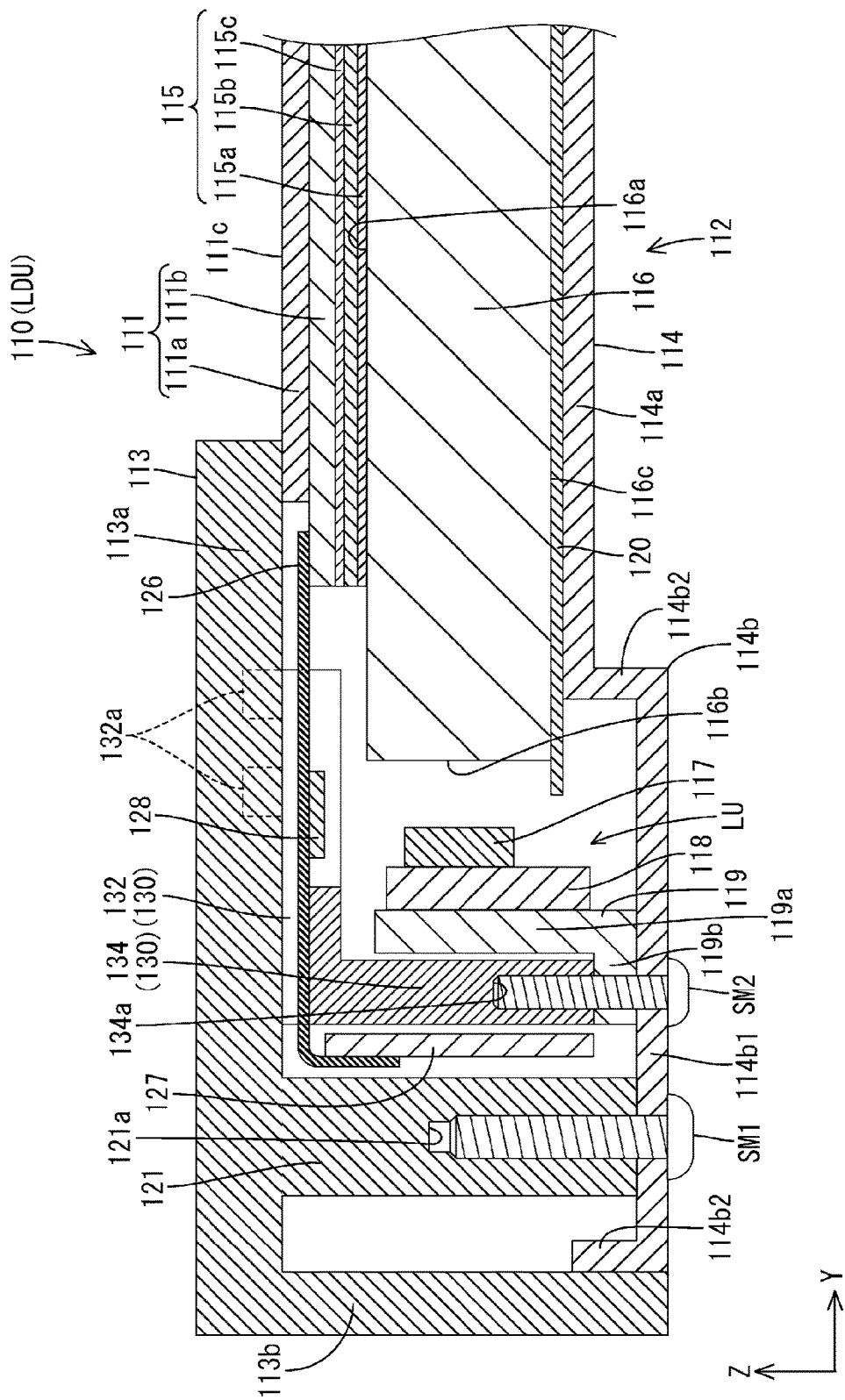
FIG. 12 is an enlarged cross-sectional view showing a cross-sectional configuration along a short side direction of a liquid crystal display device according to Embodiment 2, the figure expanding the region around the holder.

As shown in FIG. 12, in a liquid crystal display device 110 according to Embodiment 2, a heat-dissipating section 119b of the heat-dissipating member 119 is attached to a second holding section 134 of the source driver holder 130 by a second screw member SM2. The dimension in the short side direction (Y-axis direction) of the heat-dissipating section 119b of the heat-dissipating section 119 is shorter than the corresponding dimension in Embodiment 1. As a result, the heat-dissipating member 119 does not contact the frame 113 (a screw attachment section 121). As a result of such configuration, heat transmitted from the LEDs 117 to the heat-dissipating member 119 is transmitted to the frame 113 via a first holding section 132 of the source driver holder 130 in Embodiment 2. This means that it is more difficult for heat to be transmitted to the accessible frame 113 compared to a configuration in which heat that was transmitted from the LEDs 117 to the heat-dissipating member 119 is transmitted directly to the frame 113. Furthermore, the source driver holder 130 can be disposed in a stable condition due to the source driver holder 130 being attached to the frame 113 and also being attached to the heat-dissipating member 119 by the second screw member SM2.

Embodiment 3

Figure 13:
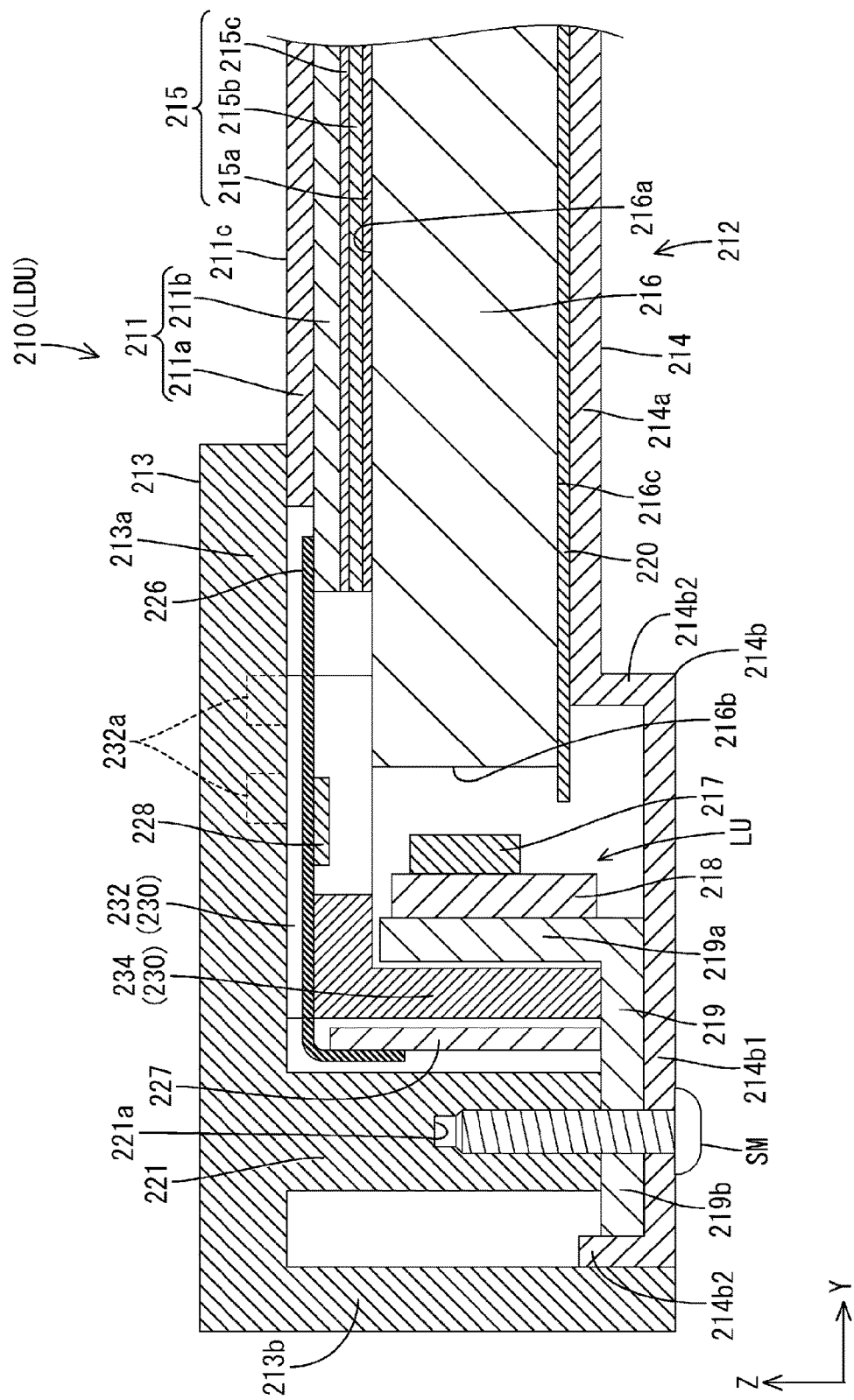
FIG. 13 is an enlarged cross-sectional view showing a cross-sectional configuration along a short side direction of a liquid crystal display device according to Embodiment 3, the figure expanding the region around the holder.

Embodiment 3 will be described with reference to FIG. 13. In Embodiment 3, the thickness of a first holding section 232 of a source driver holder 230 is different from that in Embodiment 1. Other elements are similar to those of Embodiment 1, and therefore, descriptions of the configurations, the operation, and the effects will be omitted. Parts in FIG. 13 that have 200 added to the reference characters of FIG. 5 are the same as the corresponding parts described in Embodiment 1.

In a liquid crystal display device 210 according to Embodiment 3, the thickness (the Z-axis direction dimension) of a first holding section 232 of a source driver holder 230 is greater than the corresponding thickness in Embodiment 1. Specifically, as shown in FIG. 13, portions of the first holding section 232 that are exposed on the LED 217 side have a thickness so as to abut an end of a light-exiting surface 216a of a light guide plate 216, the end facing a light-receiving face 216b of the light guide plate 216. In Embodiment 3, as a result of the first holding section 232 abutting the edge of the light-exiting surface 216a of the light guide plate 216 adjacent to the light-receiving face 216b, a large portion of the space between the LEDs 217 and a liquid crystal panel 211 is blocked by the first holding section 232. Therefore, leakage of light emitted from the LEDs 217 toward the liquid crystal panel 211 side can be prevented or suppressed by the first holding section 232.

In addition, in the liquid crystal display device 210 according to Embodiment 3, the portions of the first holding section 232 that are exposed on the LED 217 side have light-reflective properties. As a result of such a configuration, light emitted from the LEDs 217 towards the first holding section 232 can be reflected by the first holding section 232, and can be reflected toward the light-receiving face 216b. The light incidence efficiency of the light guide plate 216 with respect to the light emitted by the LEDs 217 can thereby be increased.

Embodiment 4

Embodiment 4 will be described with reference to FIG. 14. Embodiment 4 differs from Embodiment 1 in the fact that a gate driver holder (one type of holding member) 330 is also disposed on the side of the gate side flexible boards 346. Other elements are similar to those of Embodiment 1, and therefore, descriptions of the configurations, the operation, and the effects will be omitted. Parts in FIG. 14 that have 200 added to the reference characters of FIG. 3 are the same as the corresponding parts described in Embodiment 1.

Figure 14:
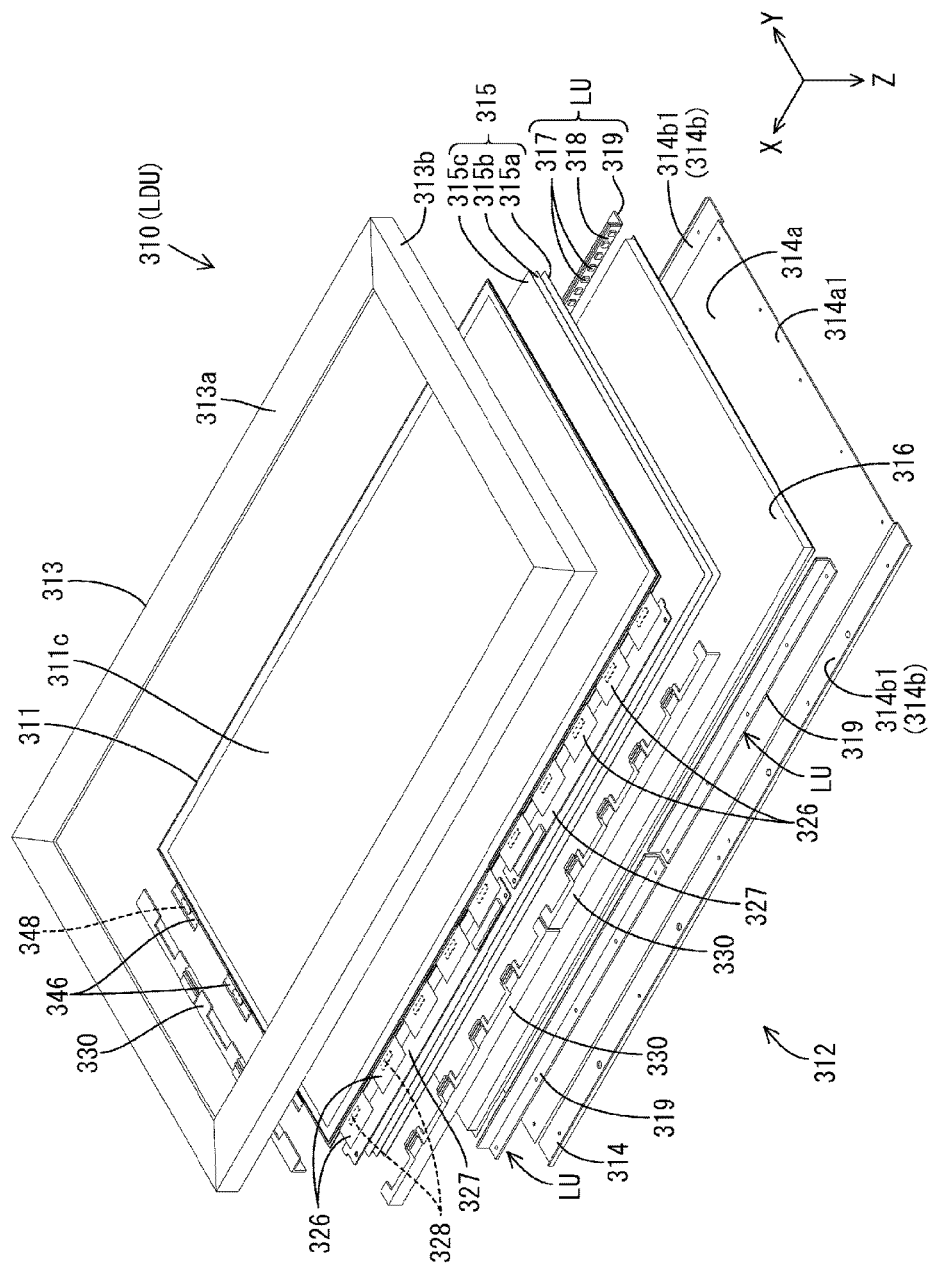
FIG. 14 is an exploded perspective view showing a schematic configuration of a liquid crystal display unit that constitutes a part of a liquid crystal display device according to Embodiment 4.

As shown in FIG. 14, a liquid crystal display device 310 according to Embodiment 4 is configured such that a gate driver holder 330 is also disposed on the gate site flexible board 346 side. The gate driver holder 330 has a configuration identical to that of a source driver holder 330. Therefore, the gate driver holder 330 is attached to a frame 313, and as a result, a gate driver 348 and the gate side flexible boards 346 on which the gate driver 348 is mounted are held to the frame 313. As described above, in Embodiment 4, a configuration can be created in which the source side flexible boards 326 and the gate side flexible boards 346 are respectively held to the frame, and the strength of the source driver holder 330 and the gate driver holder 330, which holds both sets of flexible boards, can be increased.

Modification examples of the respective embodiments mentioned above will be described below.

(1) A configuration in which wide regions and narrow regions were alternately provided in the first holding section of the source driver holder was described in the above-mentioned embodiments. There are no restrictions regarding the configuration of the first holding section, however.

(2) A configuration in which the second holding section of the source driver holder abuts the heat-dissipating section of the heat-dissipating member was described in the above-mentioned embodiments. There are no restrictions as to where the second holding section is disposed, however.

(3) A liquid crystal display device that includes an edge-lit backlight device was described in the above-mentioned embodiments. The present invention can be applied to a liquid crystal display device that includes a direct-lit device, however.

(4) The shape, configuration, and the like of the first holding section of the source driver holder may be modified, as appropriate, to be different from that of the above-mentioned embodiments.

(5) The shape, configuration, and the like of the second holding section of the source driver holder may be modified, as appropriate, to be different from that of the above-mentioned embodiments.

(6) The disposition, number, and the like of the source driver holder and the gate driver holder may be modified, as appropriate, to be different from that of the above-mentioned embodiments.

(7) In the respective embodiments above, a liquid crystal display device using a liquid crystal panel as a display panel was shown as an example, but the present invention is also applicable to a display device that uses another type of display panel.

Embodiments of the present invention were described above in detail, but these are only examples, and do not limit the scope as defined by the claims. The technical scope defined by the claims includes various modifications of the specific examples described above.

The technical elements described in the present specification or shown in the drawings realize technical utility each on their own or through a combination of various technical elements, and are not limited to the combinations defined by the claims at the time of filing. The techniques described in the present specification or shown in the drawings can accomplish a plurality of objectives simultaneously, with each objective having its own technical utility.

DESCRIPTION OF REFERENCE CHARACTERS

| | |
|---|---|
| TV | TV receiver |
| LDU | liquid crystal display unit |
| PWB | power supply board |
| MB | main board |
| CTB | control board |
| CV | cover member |
| ST | stand |
| LU | LED unit |
| 10, 110, 210, 310, 410 | liquid crystal display device |
| 11, 111, 211, 311 | liquid crystal panel |
| 12, 112, 212, 312 | backlight device |
| 13, 113, 213, 313 | frame |
| 14, 114, 214, 314 | chassis |
| 15, 115, 215, 315 | optical member |
| 16, 116, 216, 316 | light guide plate |
| 19, 119, 219, 319 | heat-dissipating member |
| 20, 120, 220 | reflective sheet |
| 26, 126, 226, 326 | source side flexible board |
| 27, 127, 227, 327 | printed circuit board |
| 23, 128, 228, 328 | source driver |
| 30, 130, 230, 330 | source driver holder |
| 32, 132, 232 | first holding section |
| 34, 134, 234 | second holding section |
| 46, 346 | gate side flexible board |
| 48, 308 | gate driver |
| 330 | gate driver holder |

What is claimed is:

1. A display device, comprising:
   a light source;
   a display panel that performs display by using light from the light source;
   a flexible board that has one end connected to the display panel;
   a driving part that is mounted on the flexible board and that drives the display panel;
   a frame having a frame section that holds the display panel by pressing on an edge on a display surface side of the display panel, and a side wall that extends from an edge of the frame section toward a side of the display device that is opposite to the display surface side; and
   a holding member that holds the flexible board with respect to the frame, the holding member having a first holding section that is disposed along the frame section, the first holding section having a portion that is attached to the frame section, and a second holding section disposed along the side wall of the frame and extending from an edge of the first holding section toward the side of the display device that is opposite of the display surface side,
   wherein said flexible board is provided in a plurality,
   wherein the portion of the first holding section that is attached to the frame is a protrusion that protrudes toward the frame, and
   wherein said protrusion is disposed between two of the flexible boards that are adjacent to each other.

2. The display device according to claim 1, further comprising:
   a signal transmission substrate that is connected to another end of the flexible board and that transmits signals to the driving part,
   wherein said signal transmission substrate is disposed between said side wall of the frame and said second holding section.

3. The display device according to claim 1, wherein said first holding section, by having a wide region and a narrow region, does not overlap the driving part in a thickness direction of the flexible board.

4. The display device according to claim 1,
   wherein said first holding section is configured such that a plurality of the wide regions and a plurality of the narrow regions are alternately disposed, and
   wherein said first holding section has a spanning section that spans a gap between the wide regions that are adjacent to each other.

5. The display device according to claim 1, further comprising:
   a light guide plate that has a light-receiving face disposed on at least one end face of the light guide plate, the light-receiving face receiving light from said light source, and a light-exiting surface disposed on one surface of the light guide plate so as to face the display panel,
   wherein at least a portion of said first holding section of the holding member is disposed so as to be on a light-exiting surface side of the light source overlapping with the light guide plate in a plan view, and
   wherein said portion of the first holding section has such a thickness so as to abut an edge of the light-exiting surface of the light guide plate adjacent to the light-receiving face.

6. The display device according to claim 5, wherein the portion of the first holding section that protrudes toward the light source has light-reflective properties.

7. The display device according to claim 1, further comprising:
   a light source substrate upon which a plurality of the light sources have been mounted; and
   a heat-dissipating member to which the light source substrate is attached,
   wherein the second holding section of the holding member abuts a portion of the heat-dissipating member.

8. The display device according to claim 7,
   wherein said portion of the heat-dissipating member is attached to said second holding section, and wherein said heat-dissipating member is separated from the frame.

9. The display device according to claim 7, further comprising:
a chassis that is disposed on a side opposite of the frame so as to face the holding member and that has at least a bottom plate,
wherein said heat-dissipating member has a light source attachment section to which the light source substrate is attached and a heat-dissipating section that extends in parallel in a plate-like shape from an edge of the light source attachment section to the bottom plate, and
wherein an entire surface of said heat-dissipating section abuts the bottom plate.

10. The display device according to claim 1,
wherein said flexible board is provided in a plurality,
wherein said plurality of flexible boards comprise a source side flexible board that is connected to one edge of the display panel and a gate side flexible board disposed on another edge of the display panel, and
wherein said holding member is disposed in plurality so as to respectively hold the source side flexible board and the gate side flexible board with respect to said frame.

11. The display device according to claim 1, wherein said display panel is a liquid crystal panel that uses liquid crystal.

12. A television receiver, comprising:
the display device according to claim 1.

* * * * *